United States Patent
Fujimoto et al.

(10) Patent No.: US 10,549,388 B2
(45) Date of Patent: Feb. 4, 2020

(54) METHOD OF WELDING OVERLAPPED PORTION, METHOD OF MANUFACTURING OVERLAP-WELDED MEMBER, OVERLAP-WELDED MEMBER, AND AUTOMOTIVE PART

(71) Applicant: NIPPON STEEL & SUMITOMO METAL CORPORATION, Tokyo (JP)

(72) Inventors: Hiroki Fujimoto, Kisarazu (JP); Tohru Okada, Futtsu (JP); Masanori Yasuyama, Kimitsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 953 days.

(21) Appl. No.: 14/409,417

(22) PCT Filed: Aug. 8, 2013

(86) PCT No.: PCT/JP2013/071565
§ 371 (c)(1),
(2) Date: Dec. 18, 2014

(87) PCT Pub. No.: WO2014/024997
PCT Pub. Date: Feb. 13, 2014

(65) Prior Publication Data
US 2015/0174702 A1  Jun. 25, 2015

(30) Foreign Application Priority Data
Aug. 8, 2012  (JP) ................. 2012-175860

(51) Int. Cl.
*B23K 28/02* (2014.01)
*B23K 11/11* (2006.01)

(52) U.S. Cl.
CPC .............. *B23K 28/02* (2013.01); *B23K 11/11* (2013.01); *Y10T 428/12347* (2015.01)

(58) Field of Classification Search
CPC ....... B32B 15/00; Y10T 428/00; B23K 26/21; B23K 26/244; B23K 26/32; B23K 26/322;
(Continued)

(56) References Cited

U.S. PATENT DOCUMENTS

| 5,942,138 A | 8/1999 | Toda et al. |
| 7,586,061 B2 * | 9/2009 | Hoebel ............... B23K 26/032 148/525 |

(Continued)

FOREIGN PATENT DOCUMENTS

| CN | 101282814 A | 10/2008 |
| CN | 102300667 A | 12/2011 |

(Continued)

OTHER PUBLICATIONS

Extended European Search Report dated May 30, 2016, for European Application No. 13827339.6.
(Continued)

*Primary Examiner* — Tu B Hoang
*Assistant Examiner* — Masahiko Muranami
(74) *Attorney, Agent, or Firm* — Birch, Stewart, Kolasch & Birch, LLP

(57) ABSTRACT

A method of welding an overlapped portion according to the present invention in which a plurality of steel sheet members are joined at an overlapped portion, and at least one of the plurality of steel sheet members contains martensite, includes: forming a spot-welded portion having a nugget in the overlapped portion; and emitting a laser beam to form a melted and solidified portion crossing an end of the nugget and located between the nugget and a position externally spaced apart from an end of the nugget by not less than 3 mm, this melted and solidified portion being formed in the steel sheet member containing the martensite so as to have
(Continued)

a depth of not less than 50% of the thickness of the steel sheet member containing the martensite at a position externally spaced apart from the end of the nugget by 1 mm.

3 Claims, 20 Drawing Sheets

(58) Field of Classification Search
CPC .......... B23K 2203/04; B23K 2201/006; B23K 11/115; B23K 11/11; B23K 11/10; B23K 11/008; B23K 9/12; B23K 9/00; B23K 26/22; B23K 26/24; B23K 26/26; B23K 26/262; B23K 26/323; B23K 26/34; B23K 26/346
USPC .... 219/121.63, 121.64, 55, 57, 58, 61.2, 67, 219/76.12, 76.17, 78.01, 85.16, 80, 83, 219/86.1, 87, 91.2, 91.22, 121.65, 121.66, 219/125.1; 428/628; 148/525
See application file for complete search history.

(56) References Cited

U.S. PATENT DOCUMENTS

| | | | |
|---|---|---|---|
| 2003/0221752 A1 | 12/2003 | Utsumi et al. | |
| 2005/0028897 A1* | 2/2005 | Kurz ................ | B23K 26/0604 148/525 |
| 2006/0043076 A1 | 3/2006 | Larsson et al. | |
| 2007/0007254 A1* | 1/2007 | Wang ................ | B23K 11/061 219/91.22 |
| 2009/0302094 A1* | 12/2009 | Milam .............. | B23K 11/0033 228/196 |
| 2011/0008648 A1* | 1/2011 | Okitsu ............. | B23K 9/23 428/683 |
| 2011/0168682 A1* | 7/2011 | Hagihara ......... | B23K 26/244 219/121.64 |
| 2011/0272384 A1 | 11/2011 | Matsushita et al. | |
| 2012/0129006 A1* | 5/2012 | Kanai .............. | B23K 11/115 428/683 |
| 2012/0160815 A1* | 6/2012 | Hayashimoto ...... | B23K 26/28 219/121.64 |

FOREIGN PATENT DOCUMENTS

| | | |
|---|---|---|
| CN | 102500936 A | 6/2012 |
| DE | 100 48 233 A1 | 4/2002 |
| EP | 2 392 428 A1 | 12/2011 |
| GB | 476794 A | 12/1937 |
| JP | 10-68021 A | 3/1998 |
| JP | 2001-259882 A | 9/2001 |
| JP | 2004-122144 A | 4/2004 |
| JP | 2008-178905 A | 8/2008 |
| JP | 2008-229720 A | 10/2008 |
| JP | 2009-241116 A | 10/2009 |
| JP | 2010-149187 A | 7/2010 |
| JP | 2010-264503 A | 11/2010 |
| JP | 2011-67853 A | 4/2011 |
| RU | 2090331 C1 | 9/1997 |
| RU | 2243071 C2 | 12/2004 |
| WO | WO 2008/058675 A1 | 5/2008 |

OTHER PUBLICATIONS

Japanese Notice of Allowance dated Jun. 7, 2016, for Japanese Application No. 2015-106743 with the English translation.
Russian Office Action and Search Report dated May 25, 2016, for Russian Application No. 2015101036 with the English translation.
Canadian Office Action, dated Apr. 22, 2016, for Canadian Application No. 2,876,821.
Chinese Office Action and Chinese Search Report, dated Mar. 23, 2016, for Chinese Application No. 201380040882.8, along with an English translation of the Chinese Search Report.
Japanese Office Action, dated Mar. 15, 2016, for Japanese Application No. 2015-106743, along with an English translation.
Japanese Office Action dated Mar. 3, 2015, for Japanese Application No. 2014-529565 with the English translation.
Hedegärd et al., "Tempering of hot-formed steel using induction heating", Master of Science Thesis, Gothenburg, Sweden, 2011, http://publications.lib.chalmers.se/records/fulltext/144308.pdf.
International Search Report, dated Oct. 15, 2013, issued in PCT/JP2013/071565.
Tailored Properties for Press-hardened body parts Dr. Camilla Wastlund, Automotive Circle International, The Insight Edition, Sep. 20-21, 2011 Gothenburg, Sweden, Ultra-high strength steels in car body lightweight design—current challenges and future potential.
Written Opinion of the International Searching Authority, dated Oct. 15, 2013, issued in PCT/JP2013/071565.

* cited by examiner

METHOD OF WELDING OVERLAPPED PORTION, METHOD OF MANUFACTURING OVERLAP-WELDED MEMBER, OVERLAP-WELDED MEMBER, AND AUTOMOTIVE PART

TECHNICAL FIELD

The present invention relates to a method of welding an overlapped portion of an overlap-welded member formed by overlapping a plurality of steel sheet members and welding them, a method of manufacturing the overlap-welded member, the overlap-welded member, and an automotive part having the overlap-welded member.

The present application claims priority based on Japanese Patent Application No. 2012-175860 filed in Japan on Aug. 8, 2012, the disclosures of which are incorporated herein by reference.

BACKGROUND ART

In recent years, structures configured with a plurality of steel sheet members made out of steel sheets are commonly configured to include an overlap-welded member having the plurality of steel sheet members joined with each other in a manner such that the steel sheet members are overlapped with each other in a manner according to the functions thereof or the environments in which they are used, to make an overlapped portion, and this overlapped portion is subjected to resistance spot welding to create a spot-welded portion having a nugget.

For example, a monocoque body (automotive part), which constitutes an automobile body, is generally formed by overlapping steel sheet members including high-strength steel sheets, and applying resistance spot welding to a flange portion (overlapped portion) in order to achieve both an improvement in collision safety and an improvement in fuel efficiency.

Currently, high-tensile steel sheets having a tensile strength of 980 MPa class are widely used as high-strength steel sheets for automobiles, and further, investigations have been performed on high-tensile steel sheets having a tensile strength of 1200 MPa class or higher.

Furthermore, another technique has been under investigation, which employs hot stamping in which both press forming and quenching are performed simultaneously in the same die to form the steel sheet members of the overlap-welded member, and manufactures hot stamps having a tensile strength of 1500 MPa or higher as the steel sheet members.

During this hot stamping, the steel sheets are heated to high temperatures to be in a highly ductile state, and then press forming is performed. Thus, high-strength steel sheet members having a tensile strength of 1500 MPa or higher can be efficiently manufactured, and further, the dimensional accuracy after the press forming can be advantageously improved.

For example, in the case of structures required to have a rust resistance, these structures may be made by overlapping steel sheet members made out of steel sheets including galvanized steel sheet having a hot-dip galvanneal coating or a hot-dip galvanizing coating formed thereon, and then joining the overlapped portion through resistance spot welding.

For example, an outer panel, constituting the monocoque body, generally includes galvanized steel sheets having a hot-dip galvanneal coating or a hot-dip galvanizing coating formed thereon.

The steel sheet members formed by applying hot stamping to high-tensile steel sheets or high-strength steel sheets having a tensile strength of 1200 MPa or higher, as described above, usually contain a quenched structure.

However, the spot-welded portion, at which the overlapped portion is joined, has a heat-affected zone (hereinafter, referred to as HAZ) of which hardness is less than the base material containing the quenched structure, because heat from the resistance spot welding causes tempering of the quenched structure around the nugget.

This softening of the HAZ which has a hardness lower than that of the base metal may also occur in the case of steel sheets of 980 MPa class. However, this softening occurs particularly in the spot-welded portion of a high-tensile steel sheet having a tensile strength of 1200 MPa or higher and containing quenched structures formed with continuous annealing equipment having a water cooling function, or a hot stamped member (high-strength steel sheet member) formed through hot stamping.

For example, in the case of a cold-rolled steel sheet of 1200 MPa class, the base metal has a Vickers hardness of approximately 390, whereas the softest zone in HAZ has a Vickers hardness of approximately 300.

This means that Vickers hardness is approximately 90 less than the base metal.

FIG. 14 is a diagram showing an example of a test piece 100 including an overlapped portion obtained by overlapping a hot stamped member (high-strength steel sheet member) 101P having a tensile strength of 1500 MPa class and formed through hot stamping and a hot stamped member (high-strength steel sheet member) 102P having a tensile strength of 1500 MPa class and formed through hot stamping, and forming a spot-welded portion 110 having a nugget 112 through resistance spot welding, and further showing a distribution of hardness according to Vickers hardness (JIS Z2244) measured by applying indentations to positions located along the broken line shown in the schematic view showing the test piece 100 (positions located at one-quarter of the thickness (thickness/4) from the interface in a direction towards the center of the steel sheet).

The Vickers hardness is measured with a load of 9.8 N and at pitches of 0.5 mm.

As shown in the graph in FIG. 14, the test piece 100 is formed by overlapping the hot stamped member 101P of 1500 MPa class formed through hot stamping and the hot stamped member 102P of 1500 MPa class formed through hot stamping. This test piece 100 exhibits a Vickers hardness of approximately 450 at the base material (hot stamped member 101P) and a Vickers hardness of approximately 300 at the softest zone 103A in the HAZ softening zone 103.

In other words, Vickers hardness at the softest zone 103A in the HAZ 103 decreases by approximately 150 in comparison with that at the base metal (hot stamped member 101P).

Then, tensile load is applied to the test piece 100. As a result, a fracture occurred from the HAZ softening zone 103 located outside of and in the vicinity of the nugget 112 as shown in FIG. 15A and FIG. 15B.

FIG. 15A is a sectional view of the surface of the steel, and shows how the hot stamped member 101P of the test piece 100 shown in FIG. 14 fractured. FIG. 15B is a sectional view showing the state of the fracture from the HAZ softening zone 103.

The softening of HAZ, as described above, does not influence the evaluation results of tensile shear tests and cross tension tests (JIS Z3137) used for joint evaluation of resistance spot welding. However, in the case where a tensile load is applied to the test piece 100 as shown in FIG. 15A and FIG. 15B, distortion is focused locally on the HAZ softening zone 103, possibly causing the fracture in the HAZ softening zone 103.

The above-described fracture in the HAZ softening zone of the spot-welded portion can be seen in the steel sheet member (press formed article) formed by steel sheets having a tensile strength of 1200 MPa or higher, and there is a possibility that the advantage of the high-strength steel sheet cannot be fully achieved at the time of impact.

For example, structural elements (overlap-welded members) such as an A-pillar, a B-pillar, a roof rail, and a side sill constituting the automobile body are required to protect occupants in a cabin at the time the automobile collides.

For this reason, deformation at the time of impact is suppressed by overlapping a plurality of steel sheet members, and joining the flange (overlapped portion) through resistance spot welding, thereby forming a tubular closed cross section.

However, in the case of serious impact modes such as SUV side crash tests of the Insurance Institute for Highway Safety (IIHS) and pole side impact tests of the Euro NCAP, there is a possibility that it is difficult to achieve predetermined impact performance even using, for example, high-strength steel sheets, because deformations concentrate on the HAZ softening zone of the spot-welded portion and the HAZ softening zone serves as a starting point of fracture.

Thus, in order to make full use of the performance of the high-strength steel sheet, it is necessary to prevent the HAZ softening zone of the spot-welded portion from serving as the starting point of fracture in the case where the structural elements of the automobile body include the steel sheet member formed by the high-strength steel sheet having a tensile strength of 1200 MPa or higher.

For example, one of the techniques disclosed includes a technique of alleviating stress at the welded portion and suppressing delayed fracture by employing both laser welding and spot welding in the case where high-strength steel sheets are welded to form a structural element for automobiles (see, for example, Patent Document 1).

Furthermore, in connection with improvement in joining at a welded portion, a technique is disclosed in which continual welded portions are formed along the spot-welded portion of a metal material through laser welding (see, for example, Patent Document 2).

Furthermore, in connection with improvement in joining at a welded portion, a technique is disclosed in which laser light is emitted onto a spot-welded portion or the vicinity of the spot-welded portion to laser weld a steel sheet on the surface side and a thick steel sheet adjacent to this steel sheet on the surface side (see, for example, Patent Document 3).

Furthermore, Non-Patent Document 1 discloses a method of preventing structural elements from fracturing from a HAZ softening zone, in which the strength of a base metal is reduced through thermal treatments applied at the time of hot stamping to a portion having a risk of causing a fracture due to impact to an A-pillar formed through hot stamping, whereby the softening of HAZ does not occur even if resistance spot welding is applied.

Furthermore, Non-Patent Document 2 discloses a method of preventing structural elements from fracturing from a HAZ softening zone, by reducing the strength of a base metal through tempering using high frequency heating applied to a flange portion of a B-pillar formed through hot stamping, thereby preventing the HAZ from softening even if resistance spot welding is applied.

RELATED ART DOCUMENTS

Patent Document

Patent Document 1: Japanese Unexamined Patent Application, First Publication No. 2008-178905
Patent Document 2: Japanese Unexamined. Patent Application, First Publication No. 2009-241116
Patent Document 3: Japanese Unexamined Patent Application, First Publication No. 2010-264503

Non-Patent Document

Non-Patent Document 1: Tailored Properties for Press-hardened body parts Dr. Camilla Wastlund, Automotive Circle International, Insight edition 2011 Ultra-high strength steels in car body lightweight design-current challenges and future potential
Non-Patent Document 2: http://publications.lib.chalmers.se/records/fulltext/144308.pdf

DISCLOSURE OF THE INVENTION

Problems to be Solved by the Invention

However, in the technique disclosed in Patent Document 1, tack welding through spot welding is applied on the line extended from a laser welding bead to be formed on the overlapped portion, and then laser welding is applied, thereby alleviating stress occurring immediately after the laser welding at the overlapped portion due to, for example, deformation associated with laser welding or spring back of a formed member.

This means that this technique relates to temporarily holding in the case of laser welding, and hence, does not contribute to improving the strength of the spot-welded portion.

Further, the technique disclosed in Patent Document 2 is a technique of performing resistance spot welding prior to application of laser welding, thereby causing the spot welded portion formed in advance to function as a means of fixing the overlapped portion.

This means that this technique mainly relates to laser welding rather than spot welding. Thus, this technique does not relate to a technique of enhancing advantages of spot welding.

Further, the technique disclosed in Patent Document 3 relates to a technique of sequentially performing a spot welding process and a laser welding process, and welding a surface-side steel sheet and a thick steel sheet adjacent to the surface-side steel sheet through laser welding to reliably apply overlap welding even in the case where no spot-welded portion is formed between two or more steel sheets including the surface-side steel sheet and the thick steel sheet. Thus, this technique does not relate to a technique of improving the strength of the spot-welded portion.

Further, in the case of a method of adjusting strength according to portions of the A-pillar as disclosed in Non-Patent Document 1, a low-strength portion is inevitably formed in a relatively large area in the A-pillar.

Thus, the effect of hot stamping, in which high-strength can be obtained, cannot be fully achieved, and further, the effect of reduction in weight is limited.

Further, with this method, characteristics related to strength vary across a relatively large transition area, which is inevitably formed between a quenched zone and a non-quenched zone, possibly causing variation in impact performance of the A-pillar.

Further, with the method of tempering the flange of the B-pillar through high frequency heating after hot stamping as disclosed in Non-Patent Document 2, the B-pillar may deform due to thermal strain resulting from high frequency heating, whereby the dimensional accuracy deteriorates.

Not only the B-pillar but also an A-pillar, a roof rail or other structural elements disposed around a door opening portion are required to be assembled accurately so that spaces between these structural elements and, for example, a door panel are uniform throughout the entire circumference of the door opening portion.

Thus, it is difficult to apply the technique disclosed in Non-Patent Document 2 to the structural elements around the door opening portion, because of reduction in the dimensional accuracy and deterioration in the quality concerning cosmetic appearance.

In a design phase for an automobile body, it may be possible to design the structural element such as a B-pillar so that the HAZ softening zone in the spot-welded portion of the flange does not reach the fracture strain at the time of impact.

However, with this design, the thicknesses of steel sheets constituting structural members increase, or additional reinforcements are required, which leads to an increase in cost or weight of the automobile body. Thus, application of this technique is difficult.

The present invention has been made in view of the problems as described above, and an object of the present invention is to, in connection with an overlap-welded member formed by welding together a plurality of steel sheet members made out of steel sheets, solve at least one of (1) and (2) described below.

(1) Provide a method of welding an overlapped portion, a method of manufacturing an overlap-welded member, the overlap-welded member, and an automotive part, which can prevent the spot-welded portion in the overlapped portion from fracturing in a HAZ softening zone, in the case where a plurality of steel sheet members containing martensite are joined through resistance spot welding.

(2) Provide a method of welding an overlapped portion, a method of manufacturing an overlap-welded member, the overlap-welded member, and an automotive part, which can prevent fractures in the spot-welded portion formed in the overlapped portion, in the case where the plurality of steel sheet members including a galvanized steel sheet having a hot-dip galvanneal coating or a hot-dip galvanizing coating formed thereon are joined through resistance spot welding.

Means for Solving the Problem

Each aspect of the present invention will be described below.

(1) A first aspect of the present invention provides a method of welding an overlapped portion in which a plurality of steel sheet members are joined at an overlapped portion, and at least one of the plurality of steel sheet members contains martensite, the method including: forming a spot-welded portion having a nugget in the overlapped portion; and emitting a laser beam to form a melted and solidified portion crossing an end of the nugget and located between the nugget and a position externally spaced apart from an end of the nugget by not less than 3 mm, the melted and solidified portion being formed in the steel sheet member containing the martensite so as to have a depth of not less than 50% of the thickness of the steel sheet member containing the martensite at a position externally spaced apart from the end of the nugget by 1 mm.

(2) A second aspect of the present invention provides a method of welding an overlapped portion in which the plurality of steel sheet members including a galvanized steel sheet having a hot-dip galvanneal coating or a hot-dip galvanizing coating formed thereon are joined at an overlapped portion, the method including: forming a spot-welded portion having a nugget in the overlapped portion; and emitting a laser beam to form a melted and solidified portion crossing an end of the nugget and located between the nugget and a position outside of the nugget, the melted and solidified portion being formed in a manner such that the depth of the melted and solidified portion at a portion corresponding to a contacting surface of the spot-welded portion is shallower than a contacting surface having the hot-dip galvanneal coating or the hot-dip galvanizing coating formed thereon.

(3) A third aspect of the present invention provides a method of manufacturing an overlap-welded member, including: overlapping a plurality of steel sheet members at an overlapped portion, and performing a welding in accordance with the method of welding an overlapped portion according to (1) or (2) described above.

(4) A fourth aspect of the present invention provides an overlap-welded member in which a plurality of steel sheet members are joined at an overlapped portion, and at least one of the plurality of steel sheet members contains martensite, in which a spot-welded portion having a nugget is formed in the overlapped portion, and, a melted and solidified portion is formed through emission of a laser beam between the nugget and a position externally spaced apart from an end of the nugget by not less than 3 mm, this melted and solidified portion crossing an end of the nugget and having a depth of not less than 50% of the thickness of the steel sheet member containing the martensite at a position externally spaced apart from the end of the nugget by 1 mm.

(5) A fifth aspect of the present invention provides an overlap-welded member in which a plurality of steel sheet members including a galvanized steel sheet having a hot-dip galvanneal coating or a hot-dip galvanizing coating formed thereon are joined at an overlapped portion, in which a spot-welded portion having a nugget is formed in the overlapped portion, and a melted and solidified portion is formed through emission of a laser beam between the nugget and a position outside the nugget so as to cross an end of the nugget and have a depth at a portion corresponding to a contacting surface of the spot-welded portion shallower than a contacting surface having the hot-dip galvanneal coating or the hot-dip galvanizing coating formed thereon.

(6) A sixth aspect of the present invention provides an automotive part including the overlap-welded member according to (4) or (5) described above.

Effects of the Invention

According to the method of welding an overlapped portion, the method of manufacturing an overlap-welded member, the overlap-welded member, and the automotive part described above, it is possible to prevent the spot-welded portion in the overlapped portion from fracturing in the HAZ softening zone, in the case where a plurality of steel sheet members containing martensite are joined through resistance spot welding.

As a result, it is possible to manufacture high-strength automotive parts exhibiting, for example, excellent occupant protection performance at the time of impact.

Further, it is possible to prevent fractures in the spot-welded portion formed in the overlapped portion, in the case where steel sheet members made out of a plurality of steel sheets including a galvanized steel sheet having a hot-dip galvanneal coating or a hot-dip galvanizing coating formed thereon are joined through resistance spot welding.

EMBODIMENTS OF THE INVENTION

In order to solve the problems described above, the present inventors carried out a study of techniques of preventing fracture of a HAZ softening zone in a spot-welded portion in an overlapped portion in an overlap-welded member formed by joining together a plurality of steel sheet members.

As a result, it was found that the strength of the spot-welded portion can be improved by emitting a laser beam onto the spot-welded portion to form a melted and solidified portion so as to cross an end of a nugget and range from the nugget up to the outside of the softest zone in a HAZ.

The present invention is based on findings that, in the case where a plurality of steel sheet members are overlapped and joined through resistance spot welding, if at least one of the plurality of steel sheet members contains martensite, it is possible to make full use of the strength of a high-strength steel sheet or hot stamped member by emitting a laser beam onto an area ranging from a nugget of the spot-welded portion and crossing an end of the nugget to form a melted and solidified portion, whereby a HAZ softening zone in the spot-welded portion is hardened to prevent fractures in the HAZ.

In this specification, the high-strength steel sheet containing martensite includes, for example, a steel sheet member (for example, press formed article) made out of a high-strength steel sheet of 980 MPa class, or a 1200 MPa class or higher, and a hot stamped member containing martensite generated through forming using hot stamping.

Further, the present inventors found that, regardless of whether the steel sheet member made out of the high-strength steel sheet or the hot stamped member is contained, in the case where the plurality of steel sheet members are overlapped and joined through resistance spot welding, and laser beam is emitted onto the spot-welded portion to form the melted and solidified portion extending from the nugget to the outside of the nugget, if at least one of the steel sheet members is made out of a galvanized steel sheet having a hot-dip galvanneal coating or a hot-dip galvanizing coating formed thereon, it is significantly effective to form the melted and solidified portion in a manner such that the depth of the melted and solidified portion at a portion corresponding to a contacting surface of the spot-welded portion is shallower than a contacting surface having a hot-dip galvanneal coating or a hot-dip galvanizing coating formed thereon.

Hereinbelow, the present invention made on the basis of the findings described above will be described with reference to the first embodiment and the second embodiment described below.

First, the first embodiment according to the present invention will be described with reference to FIG. 1A to FIG. 8F.

(First Embodiment)

Figure 1A:
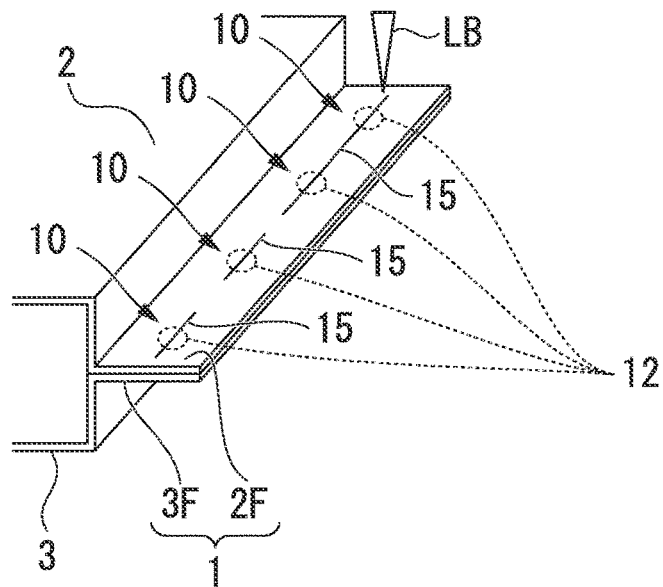
FIG. 1A is a schematic view showing an example of a flange to which the present invention is applied.
Figure 1B:
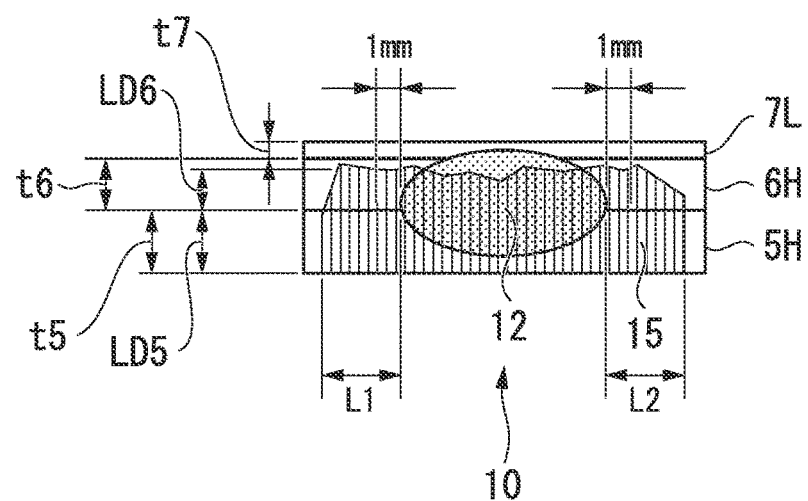
FIG. 1B is a diagram showing an example of a schematic configuration of a joint portion obtained by overlapping a plurality of steel sheet members to which the present invention is applied.

FIG. 1A is a schematic view showing an example of a flange to which the present invention is applied, and FIG. 1B is a diagram showing an example of a schematic configuration of a joint portion obtained by overlapping a plurality of steel sheet members to which the present invention is applied.

FIG. 1A shows an example of a state in which a plurality of spot-welded portions 10 are formed through resistance spot welding in a direction in which a flange (overlapped portion) 1 extends, and a laser beam LB is emitted so that melted and solidified portions 15 are formed through emission of a laser beam so as to cross ends of a nugget 12 of each of the spot-welded portions 10.

It should be noted that the flange 1 is formed by overlapping a flange 2F, which is a formed article (steel sheet member) 2 made out of a steel sheet, and a flange 3F, which is a formed article (steel sheet member) 3 made out of a steel sheet.

In this first embodiment, either of or both of the steel sheets formed into the formed article 2 and the formed article 3 are:
(a) a steel sheet member obtained by cold press forming a high-strength steel sheet (for example, high-strength steel sheet of 1200 MPa class or higher) containing martensite, or
(b) a hot stamped member (for example, steel sheet member having a tensile strength of 1200 MPa or higher) having martensite generated as a result of forming a steel sheet for a hot stamped member using hot stamping.

This means that at least one steel sheet member containing the martensite is included.

When the overlapped portion of the steel sheet members obtained by forming the high-strength steel sheet or the steel sheet members made out of the hot stamped member is subjected to resistance spot welding, a HAZ softening zone is formed in the spot-welded portion.

Due to this HAZ softening zone, the strength of the spot-welded portion is significantly lower than that of the high-strength steel sheet (base metal). However, through emission of a laser beam, the melted and solidified portion is formed.

This makes it possible to harden the HAZ softening zone, and prevent fractures caused by stress concentration on the HAZ softening zone, whereby it is possible to make full use of the strength of the high-strength steel sheet or hot stamped member.

FIG. 1B is a diagram showing an example of a schematic configuration of a joint portion obtained by overlapping three (a plurality of) steel sheet members to which the present invention is applied.

FIG. 1B shows how a high-strength steel sheet 5H, a high-strength steel sheet 6H, and a low-strength steel sheet 7L are overlapped, the spot-welded portion 10 having the nugget 12 is formed through resistance spot welding, and a laser beam is emitted from the side of the high-strength steel sheet 5H, thereby forming the melted and solidified portion 15 extending across the nugget 12.

It should be noted that, in FIG. 1B, the thicknesses of the high-strength steel sheet 5H, the high-strength steel sheet 6H, and the low-strength steel sheet 7L are t5, t6, and t7, respectively.

It should be noted that, in this specification, the high-strength steel sheet includes an "unformed high-strength steel sheet," a "steel sheet member obtained by forming a high-strength steel sheet," and a "hot stamped member obtained by forming a hot-stamping steel sheet through hot stamping."

Further, the low-strength steel sheet includes an "unformed low-strength steel sheet," and a "steel sheet member obtained by forming a low-strength steel sheet member."

Yet further, the steel sheet includes an "unformed high-strength steel sheet," an "unformed low-strength steel sheet," a "steel sheet member obtained by forming a high-strength steel sheet," a "hot stamped member obtained by forming a hot-stamping steel sheet through hot stamping," and a "steel sheet member obtained by forming a low-strength steel sheet."

In FIG. 1B, the nugget 12 is formed through the high-strength steel sheet 5H, the high-strength steel sheet 6H, and the low-strength steel sheet 7L so as to join these steel sheets.

The melted and solidified portion 15 is formed, for example, so as to start from a distance of L1 externally away from one end of the nugget 12 through the nugget 12 to a distance of L2 externally away from the other end of the nugget.

Further, the melted and solidified portion 15 is formed throughout the entire thickness t5 (100%) of the high-strength steel sheet 5H and further to a middle point in the thickness t6 of the high-strength steel sheet 6H in a direction from the high-strength steel sheet 5H toward the low-strength steel sheet 7L.

Here, the end of the nugget 12 means the maximum shape (outer boundary) of the nugget 12 when the overlapped portion formed by overlapping a plurality of steel sheet members is viewed from the surface of the steel.

The reference characters LD5 and LD6 in FIG. 1B represent the depths of the melted and solidified portion 15 in the high-strength steel sheet 5H and the high-strength steel sheet 6H, respectively, at a position externally spaced apart from the end of the nugget 12 by 1 mm.

To prevent fractures in the HAZ softening zone, it is effective for the high-strength steel sheet to have the depth of the melted and solidified portion $15 \geq 50\%$ of the thickness (here, $LD5 \geq 50\%$ of t5 and $LD6 \geq 50\%$ of t6 for the high-strength steel sheets 5H, 6H, respectively).

It should be noted that, in FIG. 1B, the high-strength steel sheet 5H and the high-strength steel sheet 6H are high-strength steel sheets, and the melted and solidified portion 15 is formed throughout the entire thickness of the high-strength steel sheet 5H (in other words, LD5=thickness t5).

Thus, the effect can be sufficiently achieved by setting the depth LD6 of the melted and solidified portion 15 in the high-strength steel sheet 6H to be larger than or equal to 50% of the thickness t6.

Figure 14:
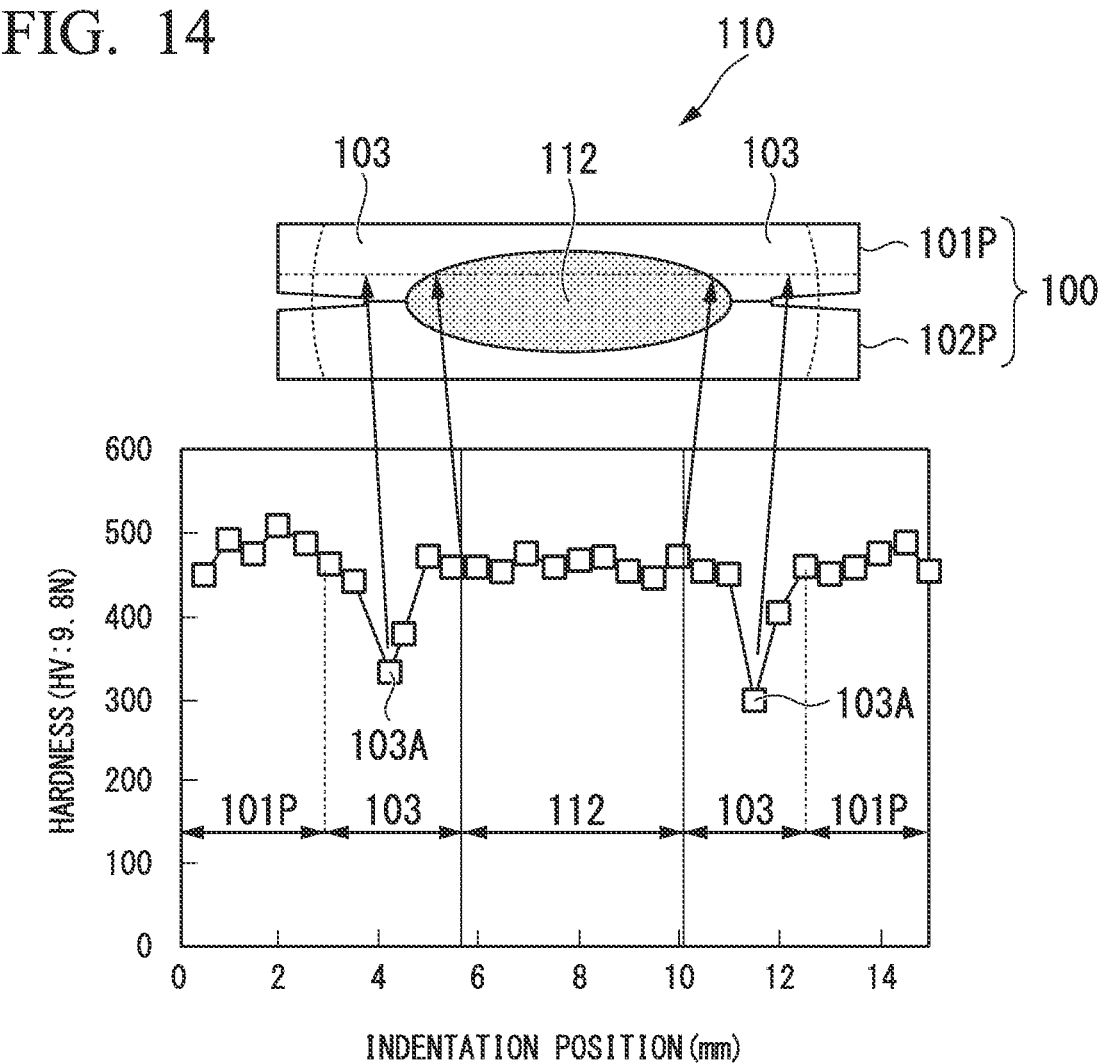
FIG. 14 is a graph showing an example of a distribution of hardness in a spot-welded portion of a hot stamped member of 1500 MPa class.
Figure 15A:
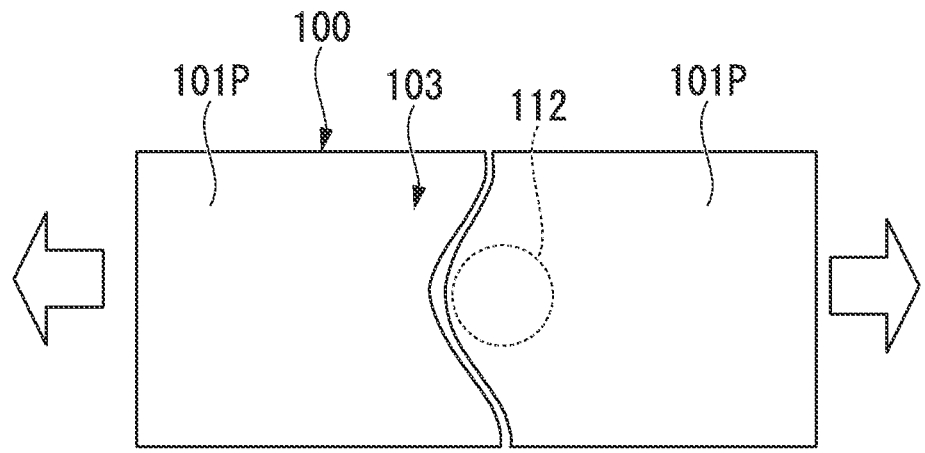
FIG. 15A is a diagram as viewed from the surface of a steel and showing the state of the fracture from a HAZ softening zone when tensile load is applied to the spot-welded portion shown in FIG. 14.
Figure 15B:
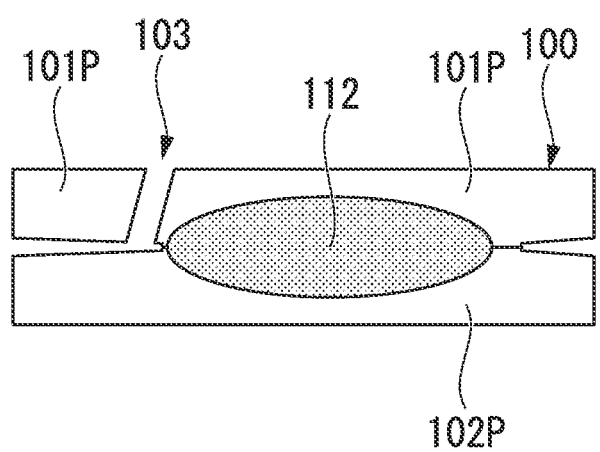
FIG. 15B is a sectional view showing a contact portion in a state where a fracture occurs from the HAZ softening zone when tensile load is applied to the spot-welded portion shown in FIG. 14.

Here, the depth LD of the melted and solidified portion 15 is defined at the position externally spaced apart from the end of the nugget 12 by 1 mm. This is based on the fact that, as shown in FIG. 14, the softest zone 103A in HAZ of the spot-welded portion 110 is located at a position externally spaced apart from the end of the nugget 112 by approximately 1 mm, and hence, forming the melted and solidified portion in the vicinity of the softest zone 103A in HAZ is effective in hardening the HAZ softening zone.

It should be noted that FIG. 1B shows an example in which the melted and solidified portion 15 passes through the central portion of the nugget 12 when the overlapped portion is viewed from the surface of the steel, and extends across the nugget 12 at two ends of the nugget 12, which are the right end and the left end of the nugget 12. However, the positions and the number of the positions at which the melted and solidified portion 15 passes through the ends of the nugget 12 are not limited to two, and the number thereof may be one, or three or more.

Further, in the case where the melted and solidified portion 15 crosses two positions, it may be possible for these positions to be located on the same extended line and on both sides of the central portion of the nugget 12. However, the positions do not necessarily have to be located on the same extended line and at both sides of the central portion of the nugget 12.

Further, in the case where the melted and solidified portion 15 is formed so as to cross two or more ends of the nugget 12, it is preferable that the depth LD of the melted and solidified portion 15 at a position externally spaced apart from the end of the nugget 12 by 1 mm satisfies LD≥50% of the thickness. However, it may be possible that a certain part of the melted and solidified portion 15 crossing the end of the nugget 12 does not satisfy LD≥(50% of the thickness).

Further, it is preferable that the melted and solidified portion 15 is formed so as to extend from the end of the nugget 12 for a length of 3 mm or longer. However, the length may be 3 mm or shorter.

Figure 2A:
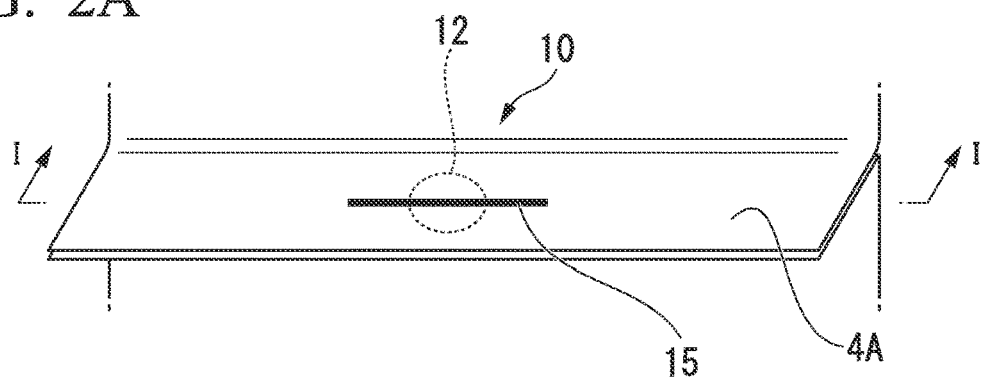
FIG. 2A is a diagram showing an example in which the present invention is applied to a hot stamped member of 1500 MPa class.

FIG. 2A is a diagram showing an example in which two members, which are a hot stamped member (steel sheet member) of 1500 MPa class and a hot stamped member (steel sheet member) of 1500 MPa class, are overlapped according to the present invention.

More specifically, FIG. 2A shows an example in which the spot-welded portion 10 having the nugget 12 is formed in a flange 4A of the hot stamped member through resistance spot welding, and a laser beam is emitted onto the spot-welded portion 10, thereby forming the melted and solidified portion 15.

Figure 2B:
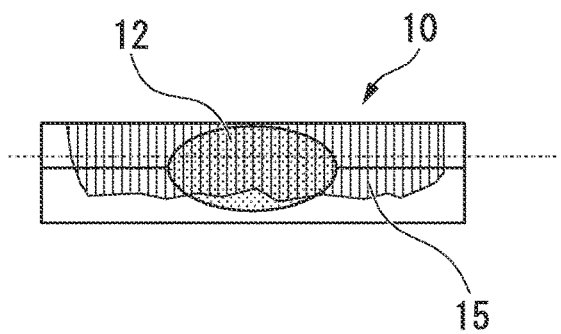
FIG. 2B is a sectional view taken along line I-I of FIG. 2A and showing the example in which the present invention is applied to the hot stamped member of 1500 MPa class.
Figure 2C:
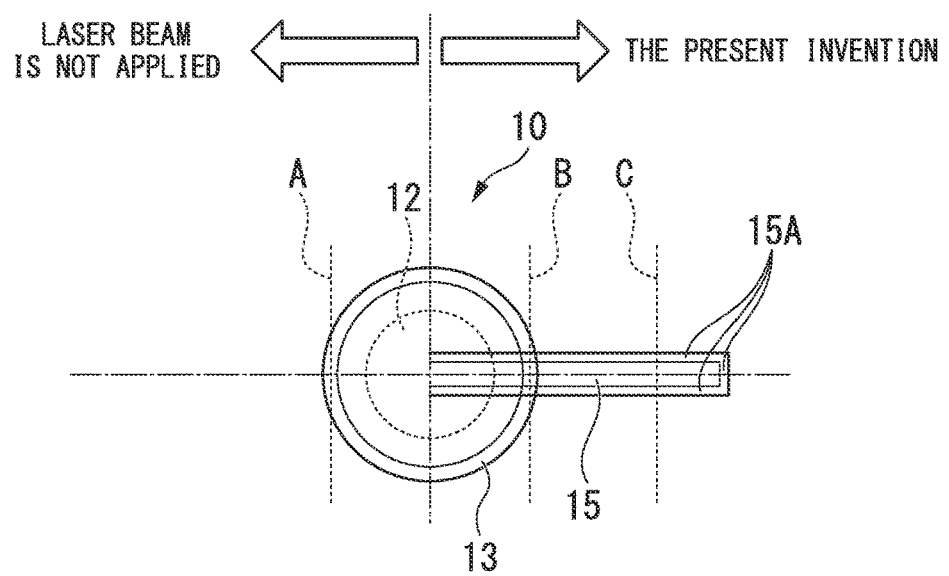
FIG. 2C is a schematic view showing a spot-welded portion shown in FIG. 2A as viewed from the surface of the steel, the left half of which shows a case where a laser beam is not applied, and the right half of which shows a case where the present invention is applied.

FIG. 2B is a sectional view taken along line I-I of FIG. 2A. FIG. 2C is a schematic view showing the spot-welded portion shown in FIG. 2A and the surroundings thereof as viewed from the surface of the steel.

It should be noted that, for the purpose of explanation, the left half of the view in FIG. 2C with respect to the central line shows a conventional state in which a laser beam is not emitted onto the spot welded portion 10, and the right half shows a state in which a laser beam is emitted onto the spot-welded portion 10 to form the melted and solidified portion 15.

Figure 3A:
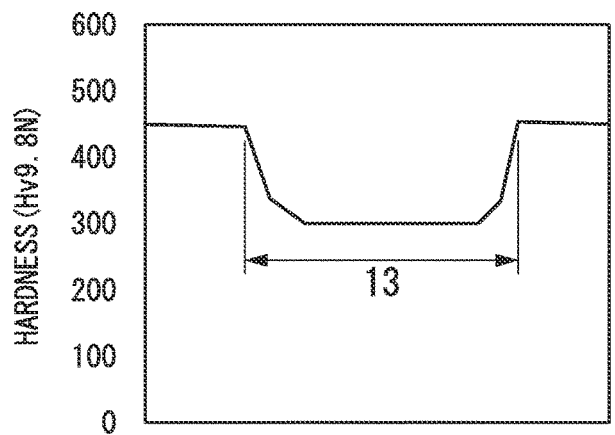
FIG. 3A is a diagram showing a distribution of hardness in the portion indicated by the broken line A in FIG. 2C.
Figure 3B:
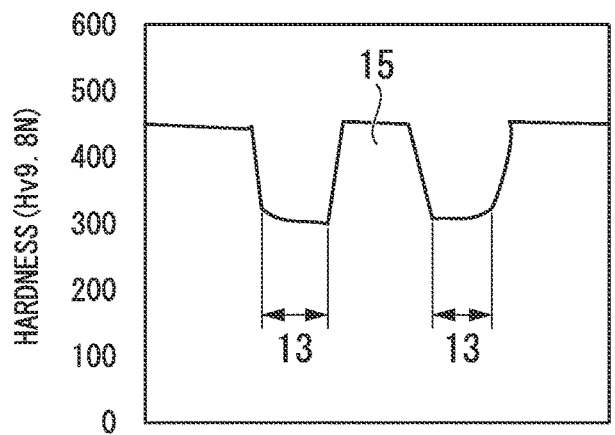
FIG. 3B is a diagram showing a distribution of hardness in the portion indicated by the broken line B in FIG. 2C.
Figure 3C:
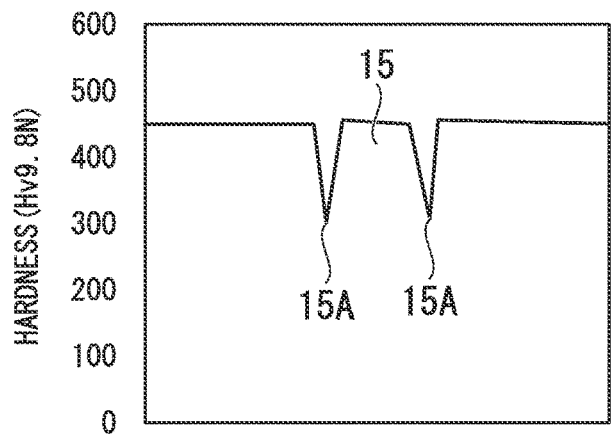
FIG. 3C is a diagram showing a distribution of hardness in the portion indicated by the broken line C in FIG. 2C.

Further, FIG. 3A, FIG. 3B, and FIG. 3C are diagrams showing hardness distributions of portions indicated by the broken line A, the broken line B, and the broken line C in FIG. 2C.

The conventional spot-welded portion 10 is similar to that of the left half of FIG. 2C, and in the portion indicated by the broken line A and shown in FIG. 3A, a HAZ softening zone 13 is formed in a large area.

This means that a large area of the HAZ softening zone 13 is pulled when tensile load is applied in the horizontal direction.

This leads to a reduction in strength against tensile load, and fractures are more likely to occur resulting from tensile load.

On the other hand, in the case where the melted and solidified portion 15 is formed between the nugget 12 and the HAZ softening zone 13 so as to cross the end of the nugget 12 by emission of a laser beam as shown in the right half of FIG. 2C, part of the HAZ softening zone of the portion indicated by the broken line 13 and shown in FIG. 3B is hardened with the melted and solidified portion 15, and the area of the HAZ softening zone 13 reduces.

As a result, the strength of the spot-welded portion 10 improves, and the tensile strength improves.

On the other hand, the melted and solidified portion 15 and a HAZ softening zone 15A are formed in a portion indicated by the broken line C in FIG. 2C onto which only a laser beam is emitted. However, as shown in FIG. 3C, the area of the HAZ softening zone 15A is small, and hence, the tensile strength is not affected.

Next, an example of an effect obtained by the present invention will be described with reference to FIG. 4A to FIG. 4C.

Figure 4A:
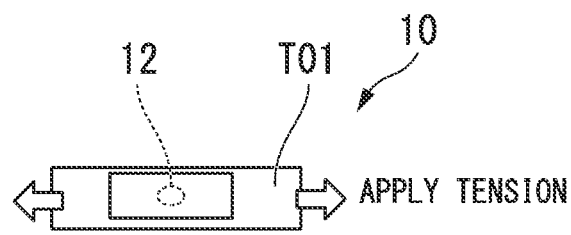
FIG. 4A is a diagram showing an example of an effect obtained by the present invention, and showing a test piece obtained through a conventional resistance spot welding.

FIG. 4A shows a test piece T01 obtained through conventional resistance spot welding, and the test piece T01 has the spot-welded portion 10 having the nugget 12 formed thereon.

Figure 4B:
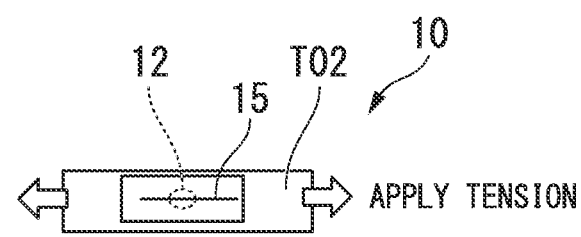
FIG. 4B is a diagram showing an example of an effect obtained by the present invention, and showing a test piece obtained through a welding method according to the present invention.

FIG. 4B shows a test piece T02 obtained through a welding method according to the present invention, and the test piece T02 has the melted and solidified portion 15 formed through emission of a laser beam so as to cross two ends of the nugget 12.

Figure 4C:
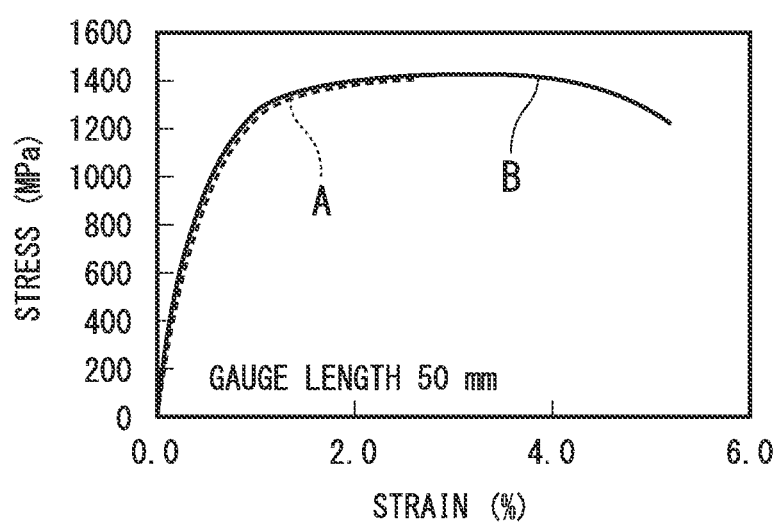
FIG. 4C is a diagram showing an example of an effect obtained by the present invention, and showing stress-strain curves of the test pieces shown in FIG. 4A and FIG. 4B.

FIG. 4C shows a stress-strain curve concerning the test pieces T01 and T02. The reference character A indicated by the broken line represents the results of the test piece T01 and the reference character B indicated by the solid line represents the results of the test piece T02.

As shown in FIG. 4C, by emitting a laser beam onto the spot-welded portion 10 to form the melted and solidified portion 15, it is possible to significantly improve the critical fracture strain in the case of application of tensile load in comparison with the spot-welded portion 10, and prevent fractures in HAZ, for example, at the time of impact.

As described above, by forming the melted and solidified portion 15 so as to extend across the nugget 12 of the spot-welded portion 10 to obtain the configuration as shown in FIG. 1B, it is possible to reduce the area of the HAZ softening zone of the spot welding where fractures are more likely to occur due to tensile load in the case of only the resistance spot welding.

With this configuration, it is possible to improve deformability until fracture at the time when tensile load is received.

FIG. 5A to FIG. 5D are explanatory diagrams showing examples of combinations of a plurality of steel sheets overlapped, and relationships between a spot-welded portion and a melted and solidified portion obtained through emission of a laser beam.

Figure 5A:
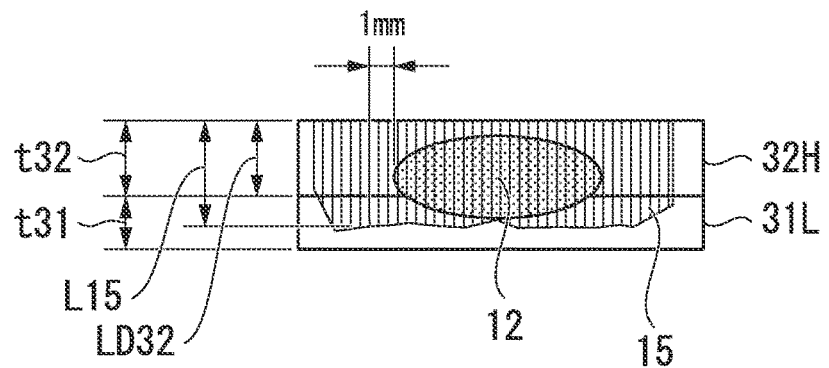
FIG. 5A is an explanatory diagram showing a relationship between a spot-welded portion and a melted and solidified portion in the case of a first example of a combination of steel sheets.

FIG. 5A is an explanatory diagram showing the first example of a combination of steel sheets, and shows a case where a low-strength steel sheet 31L (thickness t31) and a high-strength steel sheet 32H (thickness t32) are overlapped, and a laser beam is emitted from the side of the high-strength steel sheet 32H to form the melted and solidified portion 15 (depth L15).

In FIG. 5A, the reference character LD32 represents the depth of the melted and solidified portion 15 in the high-strength steel sheet 32H.

As shown in FIG. 5A, in the first example, the melted and solidified portion 15 is formed throughout the entire thickness of the high-strength steel sheet 32H (100% of the thickness t32) and up to a middle point of the low-strength steel sheet 31L in a thickness direction from the side of the high-strength steel sheet 32H to the opposite-side surface.

In the first example, the high-strength steel sheet 32H is the only high-strength steel sheet, and the melted and solidified portion 15 has the depth LD32 formed throughout the entire thickness of the high-strength steel sheet 32H in the thickness direction (LD32=(100% of the thickness t32) >(50% of the thickness t32)). Thus, it is possible to achieve sufficient effects.

Figure 5B:
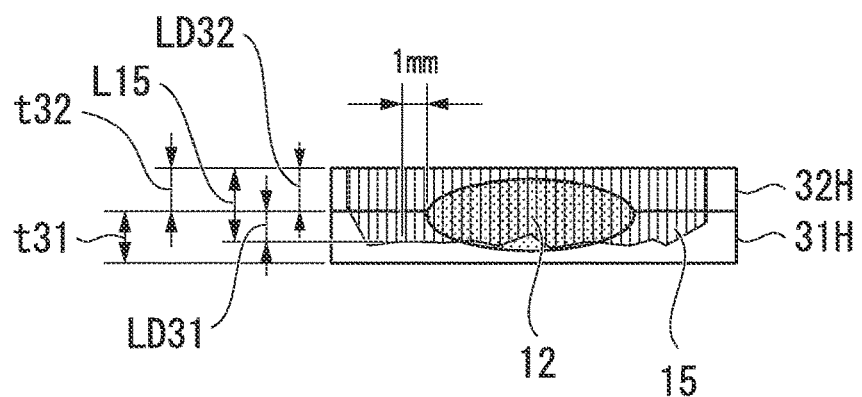
FIG. 5B is an explanatory diagram showing a relationship between a spot-welded portion and a melted and solidified portion in the case of a second example of a combination of steel sheets.

FIG. 5B is an explanatory diagram showing the second example of a combination of steel sheets, and shows a case where a high-strength steel sheet 31H (thickness t31) and a high-strength steel sheet 32H (thickness t32) are overlapped, and a laser beam is emitted from the side of the high-strength steel sheet 32H to form the melted and solidified portion 15 (depth L15).

In FIG. 5B, the reference characters LD31 and LD32 represent the depths of the melted and solidified portions 15 in the high-strength steel sheet 31H and the high-strength steel sheet 32H, respectively.

As shown in FIG. 5B, in the second example, the melted and solidified portion 15 has the depth LD32 formed throughout the entire thickness of the high-strength steel sheet 32H (LD32=(100% of the thickness t32)), and is formed up to a middle point of the high-strength steel sheet 31H in a thickness direction from the side of the high-strength steel sheet 32H to the opposite-side surface.

In the second example, the high-strength steel sheet 31H and the high-strength steel sheet 32H are the high-strength steel sheets, and the melted and solidified portion 15 is formed throughout the entire thickness of the high-strength steel sheet 32H (LD32=(100% of the thickness t32)>(50% of the thickness t32)). Thus, by setting the depth LD31 in the high-strength steel sheet 31H to be LD31≥(50% of thickness t31), it is possible to achieve sufficient effects.

Figure 5C:
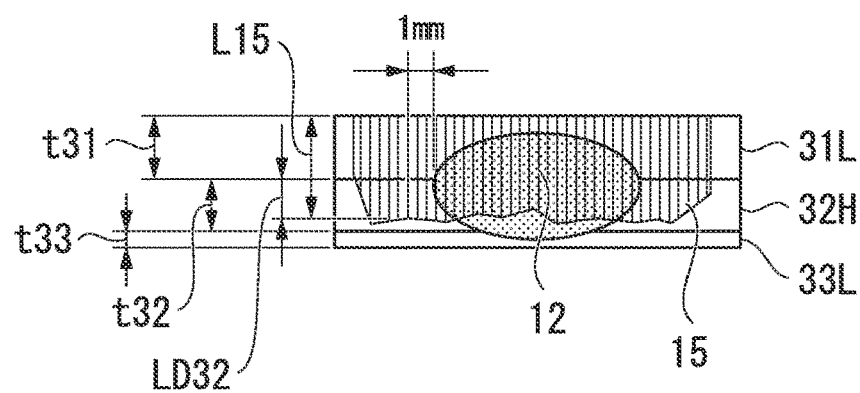
FIG. 5C is an explanatory diagram showing a relationship between a spot-welded portion and a melted and solidified portion in the case of a third example of a combination of steel sheets.

FIG. 5C is an explanatory diagram showing the third example of a combination of steel sheets, and shows a case where a low-strength steel sheet 31L (thickness t31), a high-strength steel sheet 32H (thickness t32), and a low-strength steel sheet 33L (thickness t33) are overlapped, and a laser beam is emitted from the side of the low-strength steel sheet 31L to form the melted and solidified portion 15 (depth L15).

In FIG. 5C, the reference character LD32 represents the depth of the melted and solidified portion 15 in the high-strength steel sheet 32H.

As shown in FIG. 5C, in the third example, the melted and solidified portion 15 is formed throughout the entire thickness of the low-strength steel sheet 31L, and is formed up to a middle point of the high-strength steel sheet 32H in a thickness direction from the side of the low-strength steel sheet 3 IL to the side of the low-strength steel sheet 33L.

In the third example, the high-strength steel sheet 32H is the only high-strength steel sheet. Thus, by setting the depth LD32 of the melted and solidified portion 15 in the high-strength steel sheet 32H to be LD32≥(50% of the thickness t32), it is possible to achieve sufficient effects.

Figure 5D:
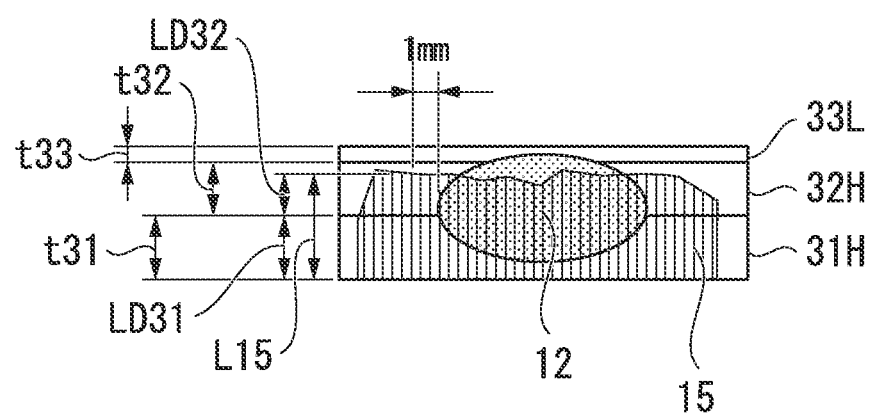
FIG. 5D is an explanatory diagram showing a relationship between a spot-welded portion and a melted and solidified portion in the case of a fourth example of a combination of steel sheets.

FIG. 5D is an explanatory diagram showing the fourth example of a combination of steel sheets, and shows a case where a high-strength steel sheet 31H (thickness t31), a high-strength steel sheet 32H (thickness t32), and a low-strength steel sheet 33L (thickness t33) are overlapped, and a laser beam is emitted from the side of the high-strength steel sheet 31H to form the melted and solidified portion 15 (depth L15).

In FIG. 5D, the reference characters LD31 and LD32 represent the depths of the melted and solidified portion 15 in the high-strength steel sheet 31H and the high-strength steel sheet 32H, respectively.

As shown in FIG. 5D, in the fourth example, the melted and solidified portion 15 is formed throughout the entire thickness of the high-strength steel sheet 31H (LD31= (100% of the thickness t31)), and is formed up to a middle point of the high-strength steel sheet 32H in a thickness direction from the side of the high-strength steel sheet 31H to the side of the low-strength steel sheet 33L.

In the fourth example, the high-strength steel sheet 31H and the high-strength steel sheet 32H are the high-strength steel sheets. Thus, by setting the depth LD32 of the melted and solidified portion 15 in the high-strength steel sheet 32H to be LD32≥(50% of the thickness t32), it is possible to achieve sufficient effects.

The first embodiment is directed to the overlap-welded member in which a plurality of steel sheet members are joined at the overlapped portion, and the steel sheet members, at least one of which steel sheet member contains the martensite, are joined through resistance spot welding.

The first embodiment is applied to form various kinds of structures including, for example, a monocoque body constituting an automotive vehicle body, and an automotive part (assembly part) such as an A-pillar and a B-pillar constituting the monocoque body.

The overlapped portion of the steel sheet member is usually a flange (overlapped portion) formed at the edge of each steel sheet as a tab for spot welding with another steel sheet. However, the overlapped portion is not limited to the flange. The overlapped portion may be one obtained by applying resistance spot welding to a portion where a flange overlaps with, for example, a shaped portion (portion other than the flange).

Examples of the steel sheet member containing the martensite include a cold press-formed article made out of a high-strength steel sheet (for example, a high-tensile steel sheet having a tensile strength of 1200 MPa class or higher) having a quenched structure containing martensite formed through continuous annealing equipment, and a hot stamped member having a tensile strength of 1200 MPa or higher and strengthened by heating a steel sheet for hot stamping to austenite temperatures or higher, and quenching the steel sheet while forming it with water-cool die.

The effects can be obtained if a high-strength steel sheet contains martensite posing a risk of fracture in spot welding due to softening of HAZ. However, the effects can be increased in the case of a high-strength steel sheet having a tensile strength of 1200 MPa or higher. Thus, it is preferable to set the lower limit of a tensile strength to 1200 MPa.

Further, although setting the upper limit of a tensile strength is not necessary, the upper limit may be set to approximately 2000 MPa for practical consideration.

Further, although setting limitation on the thickness of the steel sheet is not necessary, the lower limit of the thickness may be set to 0.7 mm for practical consideration, and it is preferable to set the upper limit to 2.6 mm.

In the case of a cold rolled material, the high-strength steel sheet having a tensile strength of 1200 MPa or higher includes an uncoated steel sheet that does not have any coating on the surface thereof, and a steel sheet on which zinc-based coating, including hot-dip galvannealing (GA coating) and hot-dip galvanizing (GI coating), is formed.

The hot stamped member includes an uncoated steel sheet member, an aluminized steel sheet member, a steel sheet having a coating of an intermetallic compound of iron and aluminum, and a steel sheet member having an iron-zinc solid solution layer and a zinc oxide layer coating thereon.

The steel sheet to be overlapped with the high-strength steel sheet described above may be a high-strength steel sheet or hot stamped member having a tensile strength of 1200 MPa class or higher, or a steel sheet having a tensile strength of 270 MPa to 980 MPa classes.

Further, the number of steel sheets to be overlapped is not limited to two, and three or more steel sheets may be overlapped.

Below, resistance spot welding will be described in detail.

During the resistance spot welding process, a plurality of steel sheet members are overlapped with each other, and resistance spot welding is applied to the overlapped portion, thereby forming a spot-welded portion having a nugget.

Welding conditions for the resistance spot welding are not specifically limited, provided that a nugget with a nugget diameter of not less than $4\sqrt{t}$ and not more than $7\sqrt{t}$ (t: thickness (mm) on the thinner side in the overlapped surface) is formed at least in the steel sheet member to be joined depending on applications.

For example, using a single-phase AC spot welding machine or inverter DC spot welding machine, it is only necessary to form the nugget described above in the overlapped portion, by employing the following conditions as appropriate: the diameter of the top end of a welding electrode: 6 mm to 8 mm; the radius of curvature R of the top end: 40 mm; squeezing force: 2.5 kN to 6.0 kN; electric current value of welding current: 7 kA to 11 kA; and power supply time in the range of 10/60 second to 40/60 second.

It should be noted that the conditions for spot welding are not limited to those described above. The conditions may be set as appropriate depending on types of steel, thickness, or other parameters.

The pitch for resistance spot welding is usually set in the range of approximately 20 mm to 60 mm. However, the pitch is not limited to this, and may be set as appropriate depending on a structure to be welded or portions of the structure to be welded.

Below, formation of the melted and solidified portion through emission of a laser beam will be described in detail.

In a process of forming a melted and solidified portion, a laser beam is emitted onto the overlapped portion to form the melted and solidified portion that crosses an end of the nugget and is located between the nugget of the spot-welded portion formed through resistance spot welding and the base material or HAZ located outside of the nugget.

In other words, after resistance spot welding is applied, a laser beam is emitted onto the overlapped portion to form the melted and solidified portion so as to extend across the HAZ softening zone formed around the nugget, thereby hardening the HAZ softening zone.

As a result, the melted and solidified portion divides the HAZ softening zone, whereby it is possible to suppress a reduction in the strength resulting from the HAZ softening zone in an expected direction of stress.

Below, an example in which the present invention is applied to an automotive part will be described with reference to FIG. 6A to FIG. 6D.

Figure 6A:
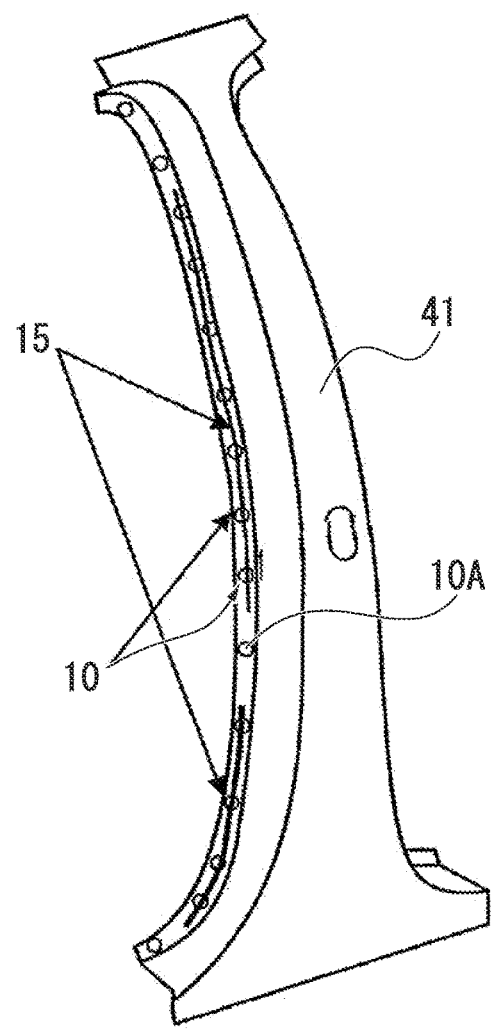
FIG. 6A is a diagram showing an example in which an overlap-welded member according to the present invention is applied to a B-pillar.
Figure 6B:
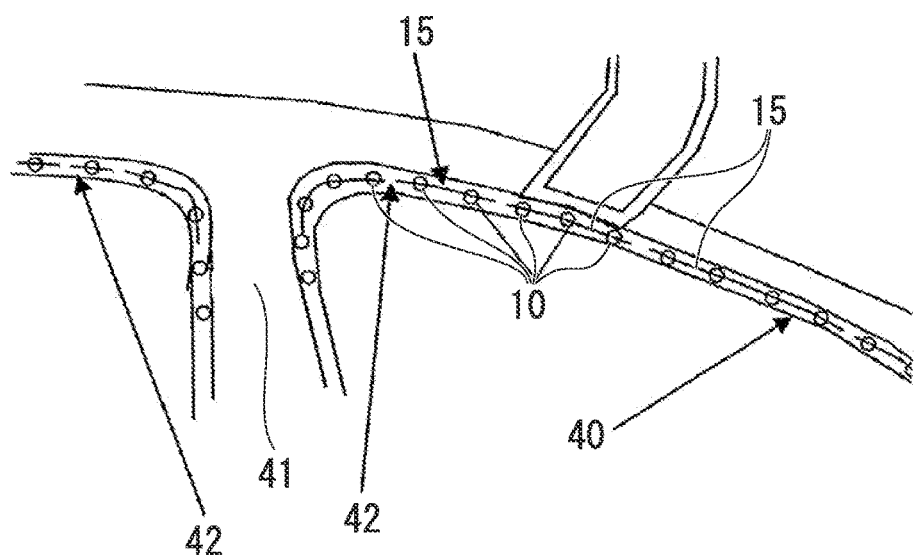
FIG. 6B is a diagram showing an example in which the overlap-welded member according to the present invention is applied to an A-pillar, a B-pillar, and a roof rail.
Figure 6C:
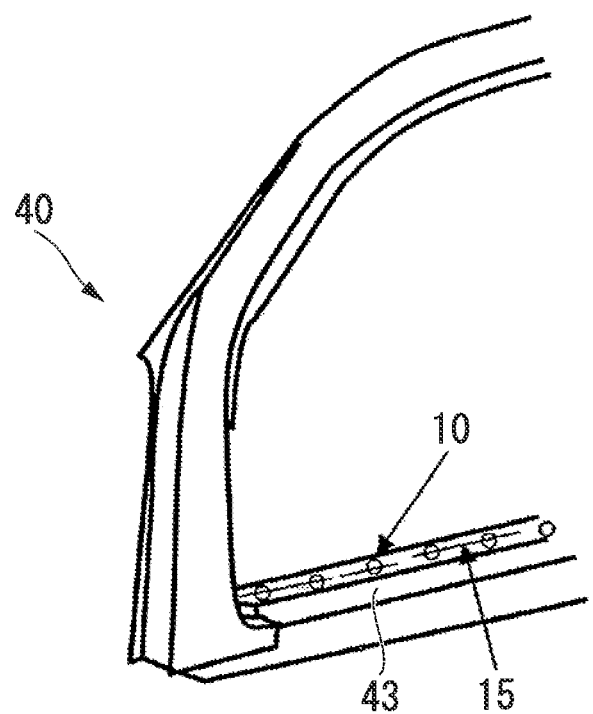
FIG. 6C is a diagram showing an example in which the overlap-welded member according to the present invention is applied to an A-pillar and a side sill.

FIG. 6A to FIG. 6C are diagrams showing an example in which the present invention is applied to a monocoque body constituting an automotive vehicle body, and is applied to an important member (automotive part) that protects occupants in the cabin in the case of side collision.

FIG. 6A is a diagram showing an example in which the overlap-welded member according to the present invention is applied to a B-pillar 41.

The B-pillar 41 has a flange on which a plurality of spot-welded portions 10 are formed along a direction in which the flange extends, and the melted and solidified portion 15 is formed through emission of a laser beam so as to extend across the plurality of spot-welded portions 10.

Furthermore, for example, in the case of the B-pillar 41, it is preferable to set the expected direction of stress to a direction along an end surface of the steel sheet member of the flange (overlapped portion) of the B-pillar 41.

Furthermore, the flange of the B-pillar 41 has a lower part curved in the front and rear direction of the vehicle body, and hence, it is preferable to set the expected direction of stress to a direction along the curved end surface of the steel sheet member of the flange (for example, a tangent direction at an end surface of the steel sheet member closest to each of the spot-welded portions 10).

It should be noted that, as shown in FIG. 6A, it may be possible to form a plurality of melted and solidified portions 15, and it may be possible to employ a configuration in which not all the spot-welded portions 10A are extended across by the melted and solidified portion 15.

FIG. 6B is a diagram showing an example in which the overlap-welded member according to the present invention is applied to an A-pillar 40, the B-pillar 41, and a roof rail 42.

Each of the A-pillar 40, the B-pillar 41, and the roof rail 42 has a plurality of spot-welded portions 10 formed along a direction in which the flange extends, and has the melted and solidified portion 15 formed with the emission of a laser beams so as to extend across the plurality of spot-welded portions 10.

Further, as shown in FIG. 6B, in the case of the flange having curves such as the portion where the B-pillar 41 and the A-pillar 40 are connected and the portion where the B-pillar 41 and the roof rail 42 are connected, the plurality of spot-welded portions 10 are formed along the curved flange, and the melted and solidified portion 15 is formed through emission of a laser beam so as to extend across these plurality of spot-welded portions 10.

It should be noted that, in the curved portions described above, it is preferable to set the expected direction of stress to a curved direction of the end surface of the steel sheet member of the flange as in the case shown in FIG. 6A (for example, the tangent direction at an end surface of the steel sheet member closest to each of the spot-welded portions 10).

Further, it may be possible to form a plurality of melted and solidified portions 15, and it may be possible to employ a configuration in which not all the spot-welded portions are extended across by the melted and solidified portion 15.

FIG. 6C is a diagram showing an example in which the overlap-welded member according to the present invention is applied to the A-pillar 40 and a side sill 43.

The side sill 43 has a flange on which a plurality of spot-welded portions 10 are formed along a direction in which the flange extends. Further, for example, the melted and solidified portion 15 extending across two adjacent spot-welded portions 10 is formed through emission of a laser beam in a manner such that the melted and solidified portion 15 is partially divided, and spaces are provided therebetween.

As described above, by dividing the melted and solidified portion 15 and leaving the base metal, having no processing applied, between the melted and solidified portions 15, it is possible to achieve toughness that the high-strength steel sheet originally has.

The same effect resulting from the spaces formed by dividing the melted and solidified portion 15 as described above can be obtained in the examples shown in FIG. 6A and FIG. 6B.

By applying the present invention to the structural element disposed around the cabin as shown in FIG. 6A to FIG. 6C, it is possible to prevent the structural element from fracturing due to softening of HAZ at the spot-welded portion 10, whereby it is possible to enhance safety against side collision.

Further, it is preferable that the melted and solidified portion 15 is formed so as to have intersection angle θ within ±30° with respect to the expected direction of stress.

Figure 6D:
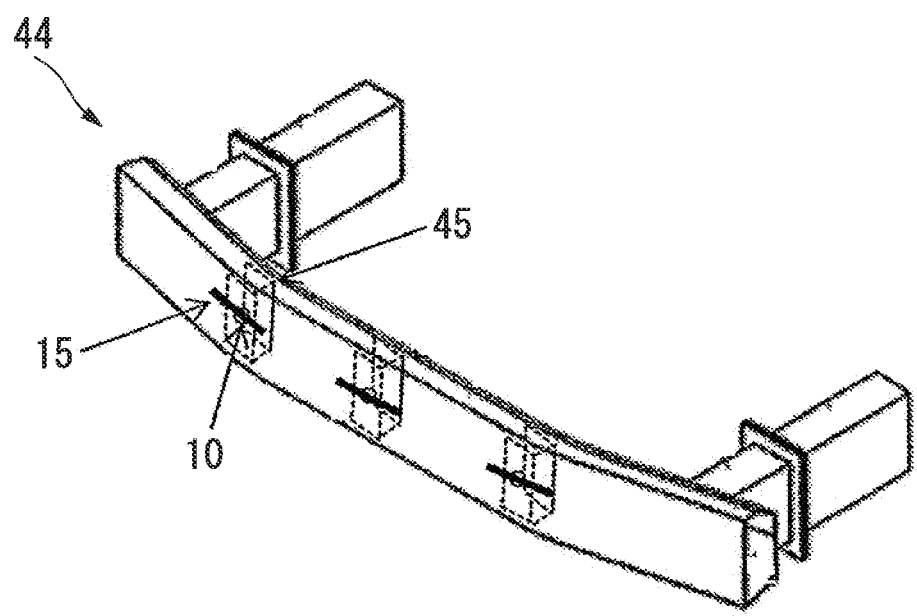
FIG. 6D is a diagram showing an example in which the overlap-welded member according to the present invention is applied to a bumper reinforce.

Further, FIG. 6D is a diagram showing an example in which the overlap-welded member according to the present invention is applied to a bumper reinforce 44 that protects occupants in the case of front-end collision or rear-end collision.

In the case of the bumper reinforce 44 shown in FIG. 6D, a bulkhead 45 is provided inner side of the body of the bumper reinforce 44 in order to maintain the cross section thereof, and the bulkhead 45 is subjected to resistance spot welding, thereby forming the spot-welded portion 10.

In the case of the bumper reinforce 44, a bending force acts in the front and rear direction, which intersects the longitudinal direction of the bumper reinforce 44, at the time of front-end collision or rear-end collision.

For this reason, it is preferable to form the melted and solidified portion 15 by emitting a laser beam so as to intersect with the longitudinal direction of the bumper reinforce 44 at an intersection angle θ falling within ±30° on the assumption that stress is expected to act in the longitudinal direction of the bumper reinforce 44.

It should be noted that, in the case of a member that receives bending as a result of collision, the expected direction of stress is a direction along the end surface of the steel sheet member, and hence, the stress acts on the member in a direction perpendicular to a plane connecting the inside and the outside of the cabin.

Next, examples of how the spot-welded portions and the melted and solidified portions are formed will be described with reference to FIG. 7A to FIG. 7L.

FIG. 7A to FIG. 7L are schematic diagrams exemplarily showing how the spot-welded portions and the melted and solidified portions, each of which is according to the present invention, are formed.

Figure 7A:
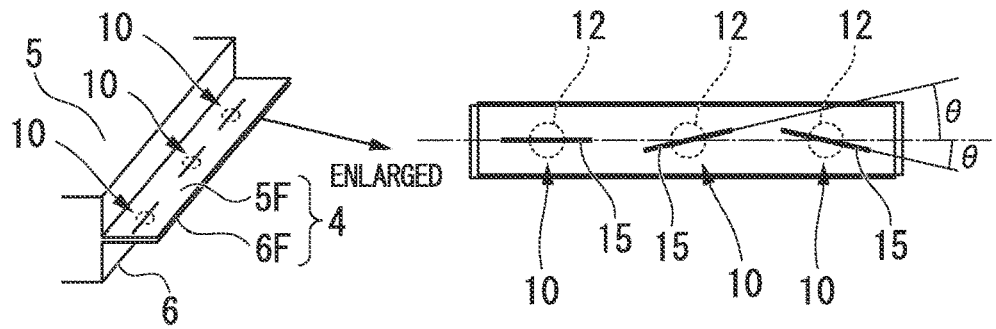
FIG. 7A is a schematic view showing a first example of how the spot-welded portions and the melted and solidified portion, each of which is according to the present invention, are formed.

FIG. 7A is a schematic diagrams showing the first example of how the spot-welded portions and the melted and solidified portions, each of which is according to the present invention, are formed, and shows an example in which a flange portion 5F of a formed article (steel sheet member) 5 and a flange portion 6F of a formed article (steel sheet member) 6 are overlapped to form a flange 4, and laser is emitted onto the nugget 12 of the spot-welded portion 10 formed on the flange 4 to form the melted and solidified portion 15.

It is desirable that the direction of the melted and solidified portion 15 formed be set so as to fall within angles θ of +30° with respect to the direction in which the flange (joint portion) 4 extends, or with respect to the expected direction of stress (with respect to the horizontal direction in FIG. 7A) as shown in FIG. 7A.

It is more preferable to set the intersection angle θ so as to fall within ±15°.

For example, the A-pillar, the B-pillar, the roof rail, the side sill, and the bumper reinforce as shown in FIG. 6A to FIG. 6D are configured such that the flange, which is joined so as to form a tubular closed cross section, is used as a tab for joining.

In many cases, at the time of impact, tensile load acts in a direction along the end surface of the steel sheet member of the flange.

For this reason, it is preferable to emit a laser beam so that the laser beam runs in a direction along the flange, thereby forming the melted and solidified portion 15 that extends across the nugget 12 of the spot-welded portion 10.

Further, in the case of the inside of a long part, tensile load frequently acts in a direction along the longitudinal direction of the part. Thus, it is preferable to emit a laser beam so that the laser beam runs in the direction along the longitudinal direction of the part, thereby forming the melted and solidified portion 15 that extends across the nugget 12 of the spot-welded portion 10.

Figure 7B:
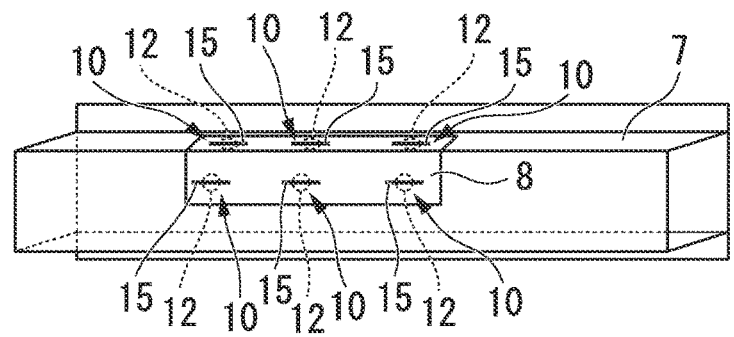
FIG. 7B is a schematic view showing a second example of how the spot-welded portions and the melted and solidified portions, each of which is according to the present invention, are formed.

FIG. 7B is a schematic view showing the second example of how the spot-welded portions and the melted and solidified portions, each of which is according to the present invention, are formed.

For example, in general, tensile load acts in the longitudinal direction of a member, in the case where the spot-welded member 10 is used for an overlapped member 8 to partially reinforce a member 7 that is not joined in a form of flange as shown in FIG. 7B, or in the case where a spot-welded portion is used for a bulkhead to overlap over a member.

Thus, it is preferable to emit a laser beam along the longitudinal direction of, for example, the member, thereby forming the melted and solidified portion 15.

Figure 7C:
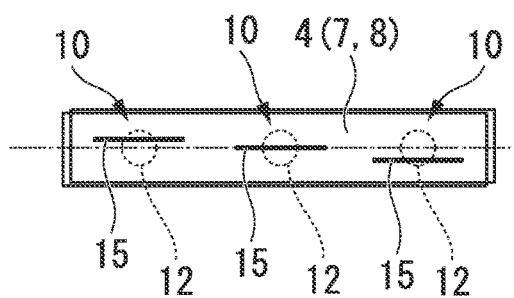
FIG. 7C is a schematic view showing a third example of how the spot-welded portions and the melted and solidified portions, each of which is according to the present invention, are formed.

FIG. 7C is a schematic view showing the third example of how the spot-welded portions and the melted and solidified portions, each of which is according to the present invention, are formed.

As shown in FIG. 7C, although it is preferable that each of the melted and solidified portions 15 formed through emission of a laser beam passes in the vicinity of the center of the nugget 12, the melted and solidified portion 15 does not have to pass through the center of the nugget 12 of the spot-welded portion 10.

Figure 7D:
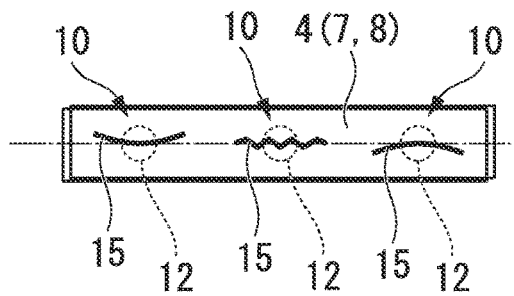
FIG. 7D is a schematic view showing a fourth example of how the spot-welded portions and the melted and solidified portions, each of which is according to the present invention, are formed.

FIG. 7D is a schematic view showing the fourth example of how the spot-welded portions and the melted and solidified portions, each of which is according to the present invention, are formed.

As shown in FIG. 7D, it is desirable to form the melted and solidified portion 15 in a straight manner from the viewpoint of efficiency in emission of a laser beam. However, it may be possible to form the melted and solidified portion 15 in a curved manner so as to have a curved portion or, for example, in a wavy manner in order to increase the length of the melted and solidified portion 15.

In such cases, it is preferable that the melted and solidified portion 15 intersects with the expected direction of stress at an intersection angle θ falling within ±30°.

Figure 7E:
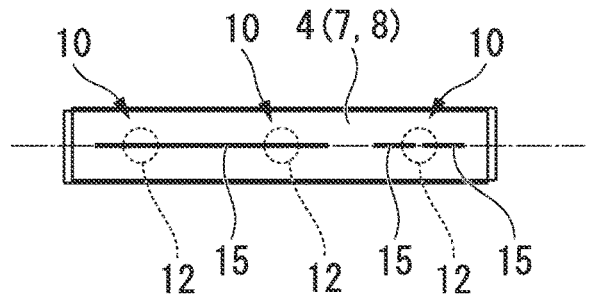
FIG. 7E is a schematic view showing a fifth example of how the spot-welded portions and the melted and solidified portions, each of which is according to the present invention, are formed.

FIG. 7E is a schematic view showing the fifth example of how the spot-welded portions and the melted and solidified portions, each of which is according to the present invention, are formed.

As shown in FIG. 7A to FIG. 7D, the melted and solidified portion 15 may be formed for each of the spot-welded portions 10. However, as shown in FIG. 7E, it may be possible to form the melted and solidified portion 15 so as to continuously connect a plurality of spot-welded portions 10.

Further, a plurality of melted and solidified portions 15 (for example, two melted and solidified portions 15) may be formed for each of the spot-welded portions 10.

Figure 7F:
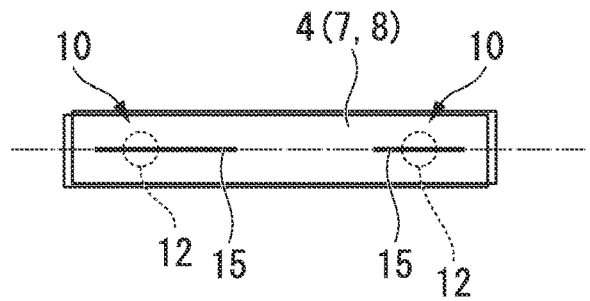
FIG. 7F is a schematic view showing a sixth example of how the spot-welded portions and the melted and solidified portions, each of which is according to the present invention, are formed.

FIG. 7F is a schematic view showing the sixth example of how the spot-welded portions and the melted and solidified portions, each of which is according to the present invention, are formed.

As shown in FIG. 7F, the melted and solidified portion 15 formed through emission of a laser beam may not be formed to be symmetrical with respect to the nugget of the spot-welded portion 10.

However, it is desirable that the melted and solidified portion 15 exist on both sides of the nugget 12 of the spot-welded portion 10, and the distance of the shorter side between the end of the nugget and the end of the melted and solidified portion 15 is 3 mm or longer.

This is because, by setting the distance between the end of the nugget and the end of the melted and solidified portion 15 to 3 mm or longer, it is possible to sufficiently prevent strain from concentrating on the HAZ softening zone.

The melted and solidified portion 15 may extend across a plurality of spot-welded portions 10 as described above.

There is no specific limitation on conditions for emission of a laser beam, and it is only necessary that predetermined melted and solidified portions 15 described above can be obtained at necessary locations.

The laser welding device used includes, for example, a disk laser, a fiber laser, a direct-diode laser, a YAG laser, and a carbon dioxide laser. The beam diameter falls in a range of 0.15 mm to 0.9 mm; the output falls in a range of 1 kW to 10 kW; and welding speed falls in a range of 1 m/min to 15 m/min.

Welding is performed using a general torch. Alternatively, it may be possible to use remote welding or laser seam stepper having a clamping device.

Conditions for emission of a laser beam are not limited to those shown as an example, and any conditions for emission of a laser beam can be applied, provided that the predetermined melted and solidified portions 15 described above can be obtained.

It is not necessary to emit laser beams onto all the spot-welded portions 10.

It is only necessary to apply laser beams only to spot-welded portions 10 that are at risk of fracture due to collision in the HAZ softening zone of the spot-welded portion 10.

Figure 7G:
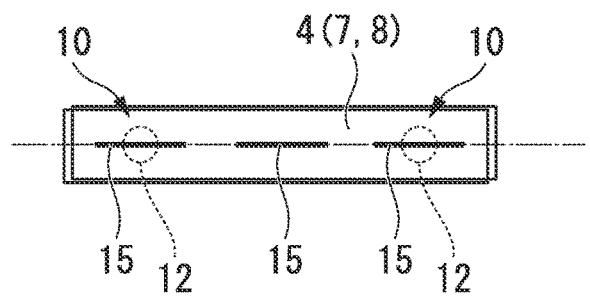
FIG. 7G is a schematic view showing a seventh example of how the spot-welded portions and the melted and solidified portions, each of which is according to the present invention, are formed.

FIG. 7G is a schematic view showing the seventh example of how the spot-welded portions and the melted and solidified portions, each of which is according to the present invention, are formed.

FIG. 7G shows an example in which a laser beam is emitted onto a portion between two adjacent spot-welded portions 10, thereby forming melted and solidified portions 15 each passing through the spot-welded portion 10 and a melted and solidified portion 15 (laser welded portion) not passing through the spot-welded portion 10.

The laser welded portion located between two adjacent spot-welded portions 10 as described above is desirable because it shortens intervals between welded portions and torsional rigidity of the member can be improved, even in the case where the overlapped portion is raised to form a gap, and joining cannot be sufficiently performed through spot welding.

Figure 7H:
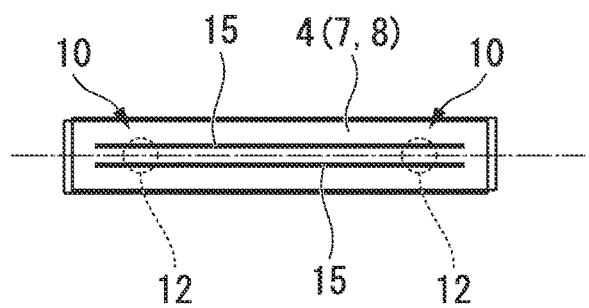
FIG. 7H is a schematic view showing an eighth example of how the spot-welded portions and the melted and solidified portions, each of which is according to the present invention, are formed.

FIG. 7H is a schematic view showing the eighth example of how the spot-welded portions and the melted and solidified portions, each of which is according to the present invention, are formed.

As shown in FIG. 7H, it may be possible that a plurality of melted and solidified portions 15 are arranged in parallel, and pass through the spot-welded portions 10 as needed.

FIG. 7H shows an example in which the number of the melted and solidified portions 15 is two. However, the number thereof may be three or more.

Figure 7I:
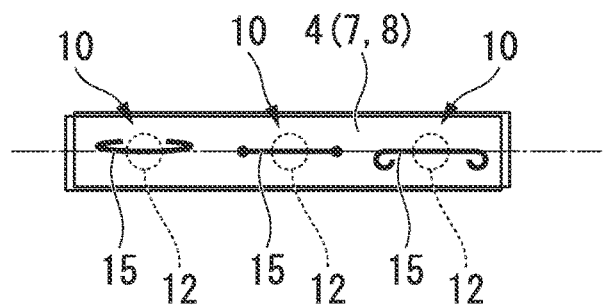
FIG. 7I is a schematic view showing a ninth example of how the spot-welded portions and the melted and solidified portions, each of which is according to the present invention, are formed.

FIG. 7I is a schematic view showing the ninth example of how the spot-welded portions and the melted and solidified portions, each of which is according to the present invention, are formed.

As shown in FIG. 7I, it may be possible that the melted and solidified portion 15 is formed through emission of a laser beam so as to have ends with a bent shape, or the starting end and the ending end of the melted and solidified portion 15 have an enlarged bead width in order to avoid stress concentration.

Figure 7J:
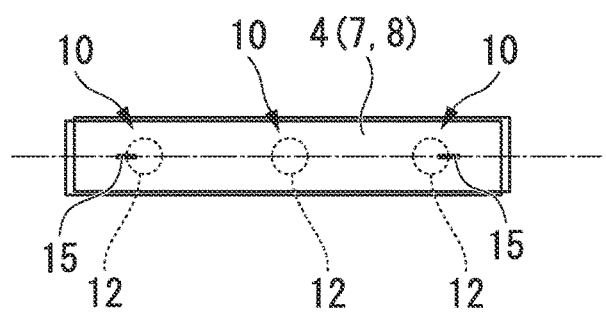
FIG. 7J is a schematic view showing a tenth example of how the spot-welded portions and the melted and solidified portions, each of which is according to the present invention, are formed.

FIG. 7J is a schematic view showing the tenth example of how the spot-welded portions and the melted and solidified portions, each of which is according to the present invention, are formed.

As shown in FIG. 7J, it may be possible to form melted and solidified portions 15 at positions located on spaced-apart ends of the spot-welded portions 10 (ends of the spot-welded portions 10 that are located further away from each other).

In the case where the melted and solidified portions 15 are formed so as to face opposite sides to each other with respect to the spot-welded portions 10 as described above, it may be possible to arrange, between the above-described melted and solidified portions 15, one or more spot-welded portions 10, one or more spot-welded portions 10 each having the melted and solidified portion 15 formed thereon, and/or one or more melted and solidified portions 15 (laser welded portions) that do not pass through any spot-welded portions 10.

Figure 7K:
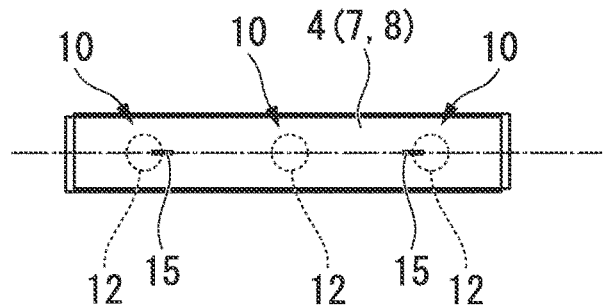
FIG. 7K is a schematic view showing an eleventh example of how the spot-welded portions and the melted and solidified portions, each of which is according to the present invention, are formed.

FIG. 7K is a schematic view showing the eleventh example of how the spot-welded portions and the melted and solidified portions, each of which is according to the present invention, are formed.

As shown in FIG. 7K, it may be possible to form melted and solidified portions 15 at positions located on nearer sides (located on the inner sides) of spot-welded portions 10.

In the case where the melted and solidified portions 15 are formed so as to face the directions in which the melted and solidified portions 15 are brought closer to each other with respect to the spot-welded portions 10 as described above, it may be possible to arrange, between the above-described melted and solidified portions 15, one or more spot-welded portions 10, one or more spot-welded portions 10 each having the melted and solidified portion 15 formed thereon, and/or one or more melted and solidified portions 15 (laser welded portions) that do not pass through any spot-welded portion 10.

Figure 7L:
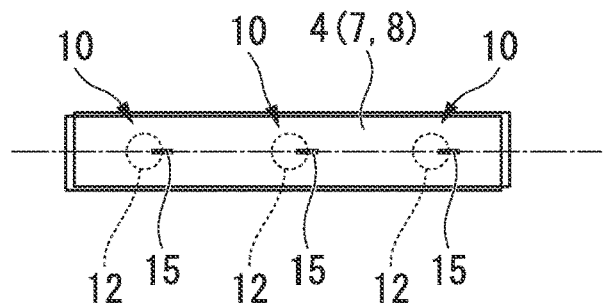
FIG. 7L is a schematic view showing a twelfth example of how the spot-welded portions and the melted and solidified portions, each of which is according to the present invention, are formed.

FIG. 7L is a schematic view showing the twelfth example of how the spot-welded portions and the melted and solidified portions, each of which is according to the present invention, are formed.

As shown in FIG. 7L, it may be possible to form adjacent melted and solidified portions 15 on the same side of the respective spot-welded portions 10 (left side in the case of FIG. 7L).

In the case where the melted and solidified portions 15 are formed on the same side of the spot-welded portions 10 as described above, it may be possible to arrange, between the above-described melted and solidified portions 15, one or more spot-welded portions 10, one or more spot-welded portions 10 each having the melted and solidified portion 15 formed thereon, and/or one or more melted and solidified portions 15 (laser welded portions) that do not pass through any spot-welded portion 10.

The resistance spot welding and the formation of the melted and solidified portion 15 to the nugget 12 of the spot-welded portion 10 according to the present invention can be applied, for example, to a process of welding vehicle bodies in the automobile manufacturing processes.

During an assembly-line operation such as welding of vehicle body, it is preferable to first position and clamp an overlap-welded member to apply resistance spot welding, and then, apply additional welding through resistance spot welding or emit a laser beam, because it is possible to prevent a laser beam emission onto the spot-welded portion from positionally shifting due to repositioning or re-clamping.

Further, more preferably, it is preferable to apply a laser beam emission in the same station as the resistance spot welding is applied.

Next, with reference to FIG. 8A to FIG. 8F, an example will be described in which a high-strength steel sheet and a low-strength steel sheet are overlapped, and a laser beam is applied, thereby forming a melted and solidified portion.

Figure 8A:
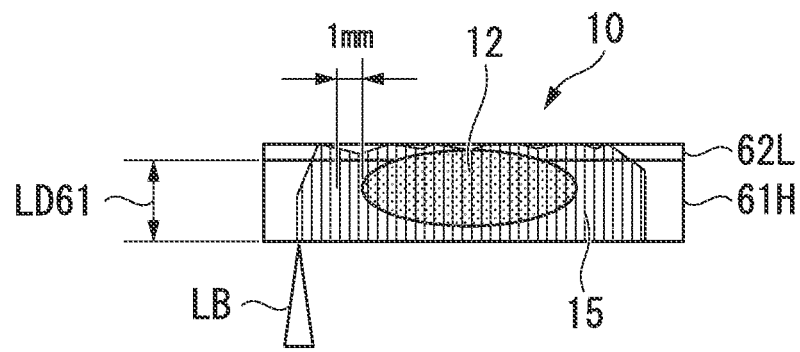
FIG. 8A is a diagram showing a first example in which a high-strength steel sheet and a low-strength steel sheet are overlapped, and a laser beam is emitted from the side of the surface of the high-strength steel sheet to form a melted and solidified portion.
Figure 8B:
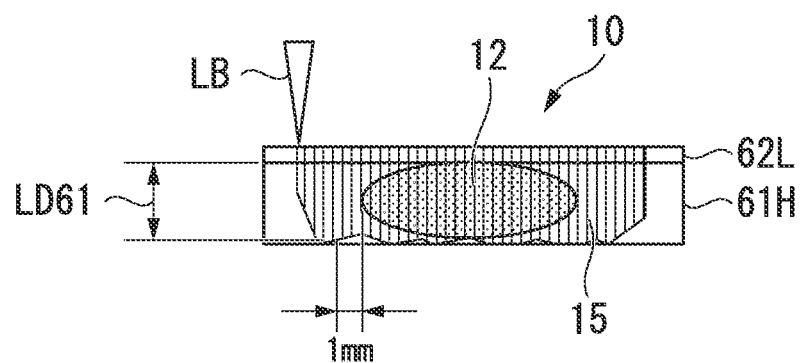
FIG. 8B is a diagram showing a second example in which a high-strength steel sheet and a low-strength steel sheet are overlapped, and a laser beam is emitted from the side of the surface of the low-strength steel sheet to form a melted and solidified portion.
Figure 8C:
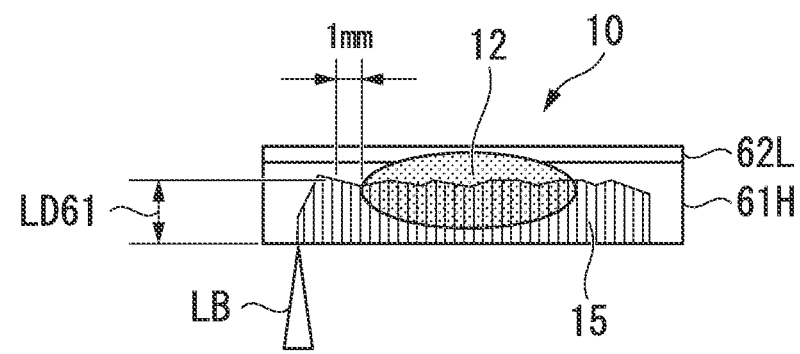
FIG. 8C is a diagram showing a third example in which a high-strength steel sheet and a low-strength steel sheet are overlapped, and a laser beam is emitted from the side of the surface of the high-strength steel sheet to form a melted and solidified portion.

FIG. 8A to FIG. 8C are explanatory views showing a case where two steel sheets overlapped are combinations of a high-strength steel sheet and a low-strength steel sheet, and showing an example in which an uncoated high-strength steel sheet (1500 MPa) 61H and an uncoated low-strength steel sheet (270 MPa) 62L are overlapped.

FIG. 8A is a diagram showing the first example. The first example shows a case where an uncoated high-strength steel sheet 61H and an uncoated low-strength steel sheet 62L are overlapped, and a laser beam LB is emitted from the side of the high-strength steel sheet 61H, thereby forming the melted and solidified portion 15 throughout the entire thickness of the uncoated high-strength steel sheet 61H and the uncoated low-strength steel sheet 62L.

In this case, the depth LD61 of the melted and solidified portion 15 in the high-strength steel sheet 61H is 100% of the thickness of the high-strength steel sheet 61H.

FIG. 8B is a diagram showing the second example. The second example shows a case where an uncoated high-strength steel sheet 61H and an uncoated low-strength steel sheet 62L are overlapped, and a laser beam LB is emitted from the side of the low-strength steel sheet 62L, thereby forming the melted and solidified portion 15 throughout the entire thickness of the uncoated high-strength steel sheet 61H and the uncoated low-strength steel sheet 62L.

In this case, the depth LD61 of the melted and solidified portion 15 in the high-strength steel sheet 61H is 100% of the thickness of the high-strength steel sheet 61H.

FIG. 8C is a diagram showing the third example. The third example shows a case where an uncoated high-strength steel sheet 61H and an uncoated low-strength steel sheet 62L are overlapped, and a laser beam LB is emitted from the side of the high-strength steel sheet 61H, thereby forming the melted and solidified portion 15 from the surface of the uncoated high-strength steel sheet 61H up to a middle point before the uncoated low-strength steel sheet 62L.

In this case, it is preferable to set the depth LD61 of the melted and solidified portion 15 in the high-strength steel sheet 61H to be more than or equal to 50% of the thickness thereof.

Figure 8D:
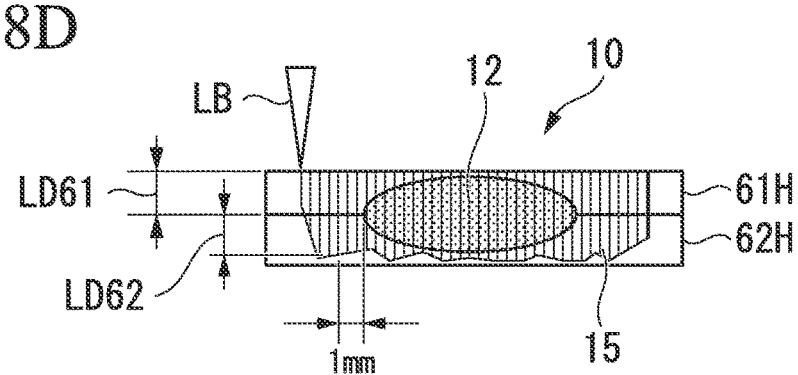
FIG. 8D is a diagram showing a fourth example in which a high-strength steel sheet and a high-strength steel sheet are overlapped, and a laser beam is emitted from the side of the surface of the high-strength steel sheet to form a melted and solidified portion.

FIG. 8D is a diagram showing the fourth example. The fourth example shows a case where an uncoated high-strength steel sheet (1500 MPa) 61H and an uncoated high-strength steel sheet (1500 MPa) 62H are overlapped, and a laser beam LB is emitted from the side of the high-strength steel sheet 61H, thereby forming the melted and solidified portion 15.

In this case, the depth LD61 of the melted and solidified portion 15 in the high-strength steel sheet 61H is 100% of the thickness of the high-strength steel sheet 61H.

As shown in FIG. 8D, in the case where the high-strength steel sheet 61H and the high-strength steel sheet 62H are overlapped, it is preferable to form the melted and solidified portion 15 throughout the entire thickness of the high-strength steel sheet 61H, and further, set the depth LD62 of the melted and solidified portion 15 in the high-strength steel sheet 62H to be more than or equal to 50% of the thickness of the high-strength steel sheet 62H.

Figure 8E:
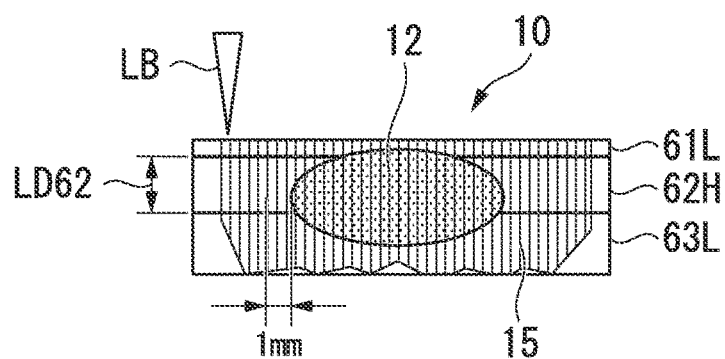
FIG. 8E is a diagram showing a fifth example in which a low-strength steel sheet, a high-strength steel sheet, and a low-strength steel sheet are overlapped in this order, and a laser beam is emitted from the side of the surface of the low-strength steel sheet to form a melted and solidified portion.
Figure 8F:
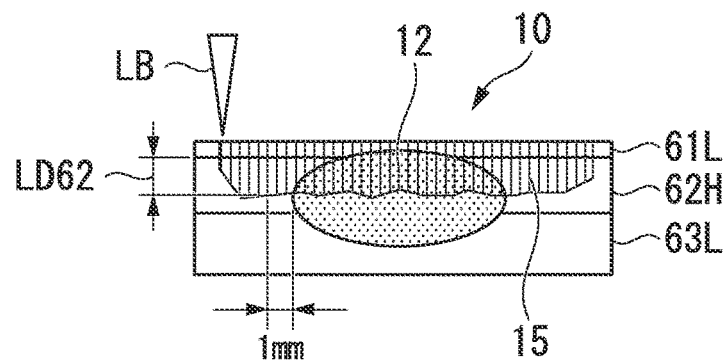
FIG. 8F is a diagram showing a sixth example in which a low-strength steel sheet, a high-strength steel sheet, and a low-strength steel sheet are overlapped in this order, and a laser beam is emitted from the side of the surface of the low-strength steel sheet to form a melted and solidified portion.

FIG. 8E and FIG. 8F show a case where a low-strength steel sheet, a high-strength steel sheet, and a low-strength steel sheet are overlapped in this order.

FIG. 8E is a diagram showing the fifth example. The fifth example shows a case where an uncoated low-strength steel sheet (270 MPa) 61L, an uncoated high-strength steel sheet (1500 MPa) 62H, and an uncoated low-strength steel sheet (590 MPa) 63L are overlapped, a laser beam LB is emitted from the side of the low-strength steel sheet 61L, thereby forming the melted and solidified portion 15.

This case is preferable because the melted and solidified portion 15 is formed to be 100% in terms of thickness of the low-strength steel sheet 61L, the high-strength steel sheet 62H, and the low-strength steel sheet 63L, and the depth LD62 of the melted and solidified portion 15 in the high-strength steel sheet 62H is 50% or more of the thickness.

FIG. 8F is a diagram showing the sixth example. The sixth example shows a case where an uncoated low-strength steel sheet (270 MPa) 61L, an uncoated high-strength steel sheet (1500 MPa) 62H, and an uncoated low-strength steel sheet (590 MPa) 63L are overlapped, and a laser beam LB is emitted from the side of the low-strength steel sheet 61L, thereby forming the melted and solidified portion 15.

In this case, as shown in FIG. 8F, the melted and solidified portion 15 is formed throughout the entire thickness of the low-strength steel sheet 61L and up to a middle point of the high-strength steel sheet 62H from the low-strength steel sheet 61L toward the low-strength steel sheet 63L.

It is preferable to set the depth LD62 of the melted and solidified portion 15 in the high-strength steel sheet 62H to be more than or equal to 50% of the thickness of the high-strength steel sheet 62H.

(Second Embodiment)

Next, the second embodiment according to the present invention will be described.

The first embodiment described above relates to a case where the steel sheet is an uncoated steel sheet. However, it was found that, in the case where steel sheets having GA coating or GI coating, which is a typical zinc-coated steel sheet, are combined, hole defects may occur in the spot-welded portion 10, by forming the spot-welded portion 10 through resistance spot welding, and emitting a laser beam LB onto the spot-welded portion 10.

Below, with reference to FIG. 9A and FIG. 9B, the effect of laser emission on the spot-welded portion 10 will be described.

Figure 9A:
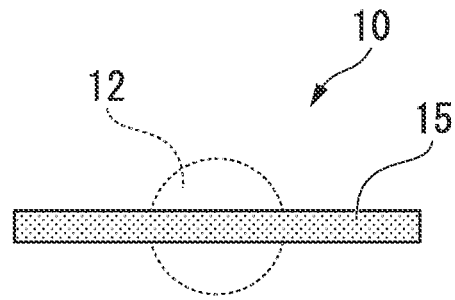
FIG. 9A is an explanatory view showing the influence of laser emission on the spot-welded portion, and is a diagram showing the spot-welded portion and the melted and solidified portion formed in the overlapped portion made of an uncoated high-strength steel sheet (1500 MPa) and an uncoated low-strength steel sheet (440 MPa).

FIG. 9A is a diagram showing a spot-welded portion 10 and a melted and solidified portion 15 formed in the overlapped portion made out of an uncoated high-strength steel sheet (1500 MPa) and an uncoated low-strength steel sheet (440 MPa).

In the case of uncoated steel sheets, no hole defect occurs as shown in FIG. 9A.

Figure 9B:
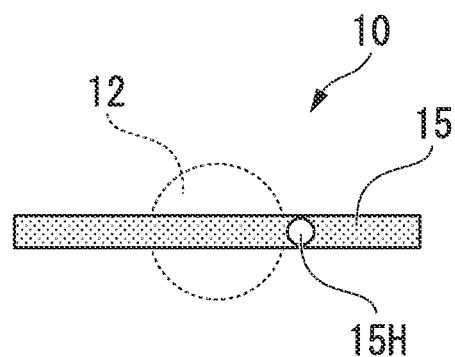
FIG. 9B is an explanatory view showing the influence of laser emission on the spot-welded portion, and is a diagram schematically showing a hole defect of the spot-welded portion and the melted and solidified portion formed in the overlapped portion made of an uncoated high-strength steel sheet (1500 MPa) and a hot-dip galvannealed low-strength steel sheet (440 MPa).

On the other hand, FIG. 9B is a diagram showing an example in which a melted and solidified portion 15 is formed in a spot-welded portion 10 formed in the overlapped portion made out of an uncoated high-strength steel sheet (1500 MPa) and a hot-dip galvannealed low-strength steel sheet (440 MPa).

It was found that, in the case of a hot-dip galvannealing steel sheet, a hole defect 15H may occur in the melted and solidified portion as shown in FIG. 9B, and this hole defect 15H reduces the strength of the spot-welded portion 10 and serves as a starting point of fracture at the time when the automobile collides, whereby there is a possibility that it is not possible to make full use of the strength of the high-strength steel sheet.

Figure 10:
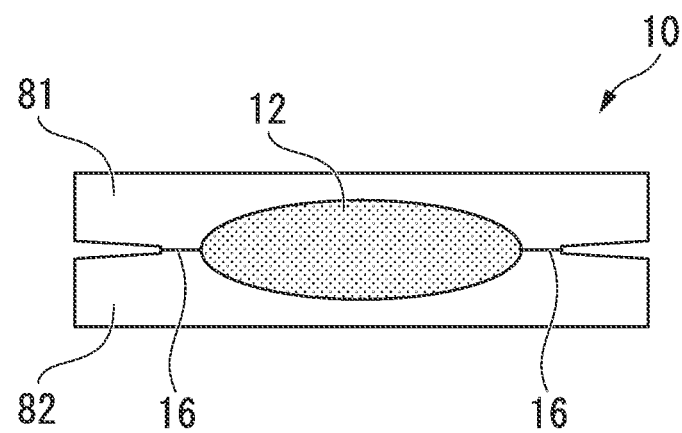
FIG. 10 is a sectional view showing a contact portion in the spot-welded portion.

The present inventors made thorough investigations on causes of occurrence of the hole defect 15H shown in FIG. 9B, and as a result, found that the hole defect 15H occurs at a contact portion 16 of the spot-welded portion 10 as shown in FIG. 10.

The contact portion 16 shown in FIG. 10 is located outside of the nugget 12, and is a portion of the spot-welded portion 10 that is joined through application of pressure without melting.

It is assumed that the hole defect 15H is created in a manner such that, when a laser beam LB is emitted to form the melted and solidified portion 15, the contact portion 16 having the zinc-coating formed thereon is molten through emission of a laser beam LB, zinc is explosively vaporized, and molten steel is blown away.

The second embodiment is directed to joining steel sheet members including galvanized steel sheets having a hot-dip galvanneal coating or a hot-dip galvanizing coating formed thereon.

The present inventors carried out a study of the problems described above. As a result, they found that, in the case where the steel sheets including these GA coating or GI coating are contained, it is possible to obtain a favorable welded joint that does not have any hole defect 15H, by controlling the depth of the melted and solidified portion 15 formed through emission of a laser beam LB in a manner that does not melt the contact portion 16 of spot welding on a surface overlapped with GA coating or GI coating.

It should be noted that, in the case of an uncoated steel sheet, an aluminized steel sheet, a steel sheet having a coating of an intermetallic compound of iron and aluminum, and a steel sheet having an iron-zinc solid solution layer and a zinc oxide phase coating thereon, a boiling point of the coating is high, and hence, it is less likely that welding defects occur resulting from the coating on the overlapped surface.

Further, it is preferable to set the depth LD of the melted and solidified portion 15 at a position located outside of the melted and solidified portion 15 and spaced apart from the end of the nugget 12 of the spot-welded portion 10 by 1 mm, to be more than or equal to 50% of the thickness of the high-strength steel sheet.

In the second embodiment, it may be possible to arbitrarily choose whether the plurality of steel sheet members include, for example, steel sheet or hot stamped member having martensite, particularly whether the plurality of steel sheet members include a high-strength steel sheet having a tensile strength of 1200 MPa or higher. Further, it may be possible to employ a configuration in which no high-strength steel sheet is included.

Further, it may be possible to combine steel sheet members made out of an uncoated steel sheet, an aluminized steel sheet, a steel sheet having a coating of an intermetallic compound of iron and aluminum, and/or a steel sheet having an iron-zinc solid solution layer and a zinc oxide phase coating thereon.

Further, in the second embodiment, the plurality of steel sheet members are overlapped with each other, a spot-welded portion 10 having a nugget 12 is formed through resistance spot welding, and a laser beam LB is emitted, thereby forming a melted and solidified portion 15 that extends across the nugget 12, for example, in a manner such that the melted and solidified portion 15 crossing the end of the nugget 12 extends from the end of the nugget 12 to a position distanced not less than 3 mm from the end of the melted and solidified portion 15, this end of which is located outside of the nugget.

First, in the case where the overlapped steel sheet member onto which a laser beam is emitted is a steel sheet member only formed by any of an uncoated steel sheet, an aluminized steel sheet, a steel sheet having a coating of an intermetallic compound of iron and aluminum, and a steel sheet having an iron-zinc solid solution layer and a zinc oxide phase coating thereon, the hardness of the softest zone in HAZ can be improved by forming the melted and solidified portion 15 through the emission of a laser beam with the depth LD of the melted and solidified portion 15 at a position externally spaced apart from the end of the nugget 12 by 1 mm being set to be more than or equal to 50% of each of the thicknesses of all the high-strength steel sheet.

The upper limit of the depth LD of the melted and solidified portion 15 formed is 100% of the thickness of the high-strength steel sheet. It is preferable to set the depth LD of the melted and solidified portion 15 formed, to be more than or equal to 50% of the thickness, because the effect of preventing fractures in the HAZ softening zone can be sufficiently achieved with this dept. However, it may be possible to set the depth LD of the melted and solidified portion 15 to be less than 50% of the thickness.

Below, descriptions will be specifically made with reference to FIG. 11A to FIG. 11F.

FIG. 11A to FIG. 11F only show a contact portion in the case where one of the steel sheets overlapped is a hot-dip galvannealed low-strength steel sheet 91LZ.

FIG. 1A is a diagram showing an example in which a high-strength steel sheet and a low-strength steel sheet are overlapped, and showing an example in which two steel sheets, a hot-dip galvannealed low-strength steel sheet (270 MPa) 91LZ and an uncoated high-strength steel sheet (1500 MPa) 92H, are overlapped.

Figure 11A:
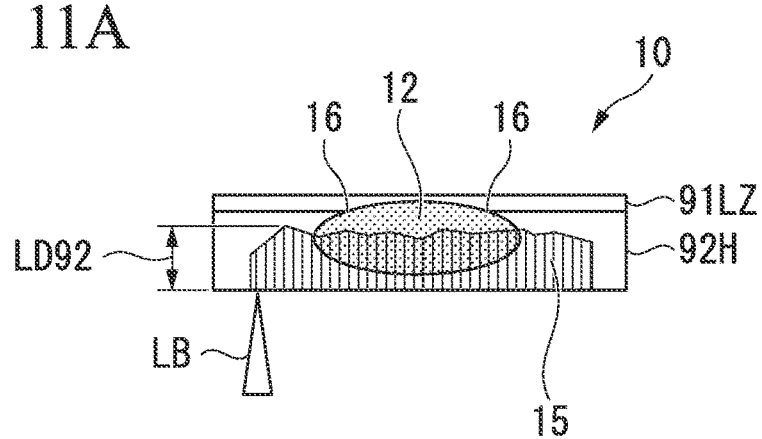
FIG. 11A is a diagram showing an example in which a hot-dip galvannealed low-strength steel sheet and an uncoated high-strength steel sheet are overlapped, and a laser beam is emitted from the side of the high-strength steel sheet, thereby forming the melted and solidified portion.

In FIG. 11A, a laser beam LB is emitted from the side of the uncoated high-strength steel sheet 92H, and control is performed so that the melted and solidified portion 15 does not reach the contact portion 16 in the spot-welded portion 10 serving as the overlapped surface, and the contact portion 16, where the hot-dip galvanneal coating lies, is not molten.

It should be noted that it is preferable to set the depth LD92 of the melted and solidified portion 15 in the high-strength steel sheet 92H at a position externally spaced apart from the end of the nugget 12 of the spot-welded portion 10 by 1 mm, to be more than or equal to 50% of the thickness.

Figure 11B:
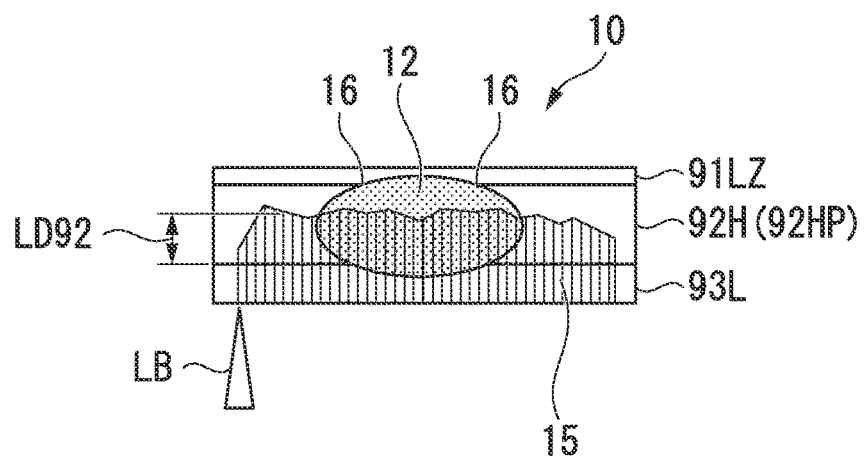
FIG. 11B is a diagram showing an example in which a hot-dip galvannealed low-strength steel sheet, an uncoated high-strength steel sheet, and an uncoated low-strength steel sheet are overlapped, and a laser beam is emitted from the side of the uncoated low-strength steel sheet, thereby forming the melted and solidified portion.

FIG. 11B shows an example in which three steels, an outer panel including a hot-dip galvannealed low-strength steel sheet 91LZ, a reinforce including an uncoated high-strength steel sheet 92H, and an inner panel including an uncoated low-strength steel sheet 93L, are overlapped, and this serves as, for example, an example of a structure of a flange portion of a B-pillar of an automobile.

In this case, after spot welding, a laser beam LB is emitted from the side of the uncoated inner panel (low-strength steel sheet 93L) to be disposed on the inside of the cabin of the automobile body, thereby forming the melted and solidified portion 15 in the low-strength steel sheet 93L and the high-strength steel sheet 92H.

The melted and solidified portion 15 is formed by controlling such that the melted and solidified portion 15 does not reach the contact portion 16 located on the side of the surface where the low-strength steel sheet 91LZ and the high-strength steel sheet 92H are overlapped, and the contact portion 16, where the hot-dip galvanneal coating lies, is not molten.

It should be noted that it is preferable to set the depth LD92 of the melted and solidified portion 15 in the high-strength steel sheet 92H at a position externally spaced apart from the end of the nugget 12 of the spot-welded portion 10 by 1 mm, to be more than or equal to 50% of the thickness.

It should be noted that, in the case where a hot stamped member having an iron-zinc solid solution layer and a zinc oxide layer coating thereon or a hot stamped member 92HP having an intermetallic compound of iron and aluminum coating thereon is used in place of the high-strength steel sheet 92H, which is a reinforce, it may be possible to treat them as is the case with the uncoated hot stamped member.

This is because the welding defects are less likely to occur in these surface coating, as is the case with GA coating or GI coating.

Figure 11C:
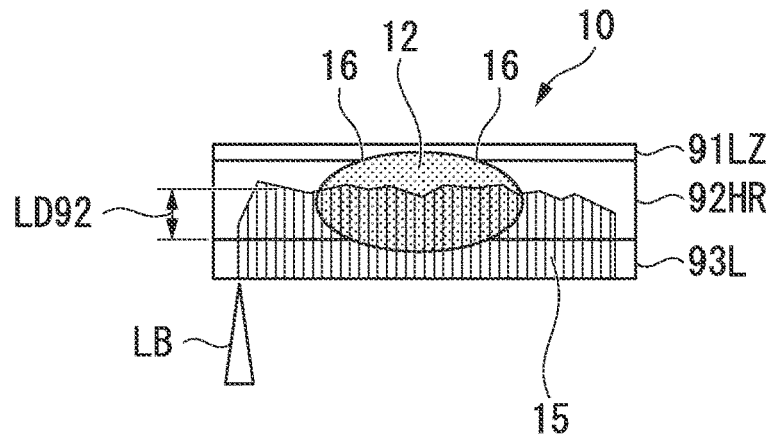
FIG. 11C is a diagram showing an example in which a hot-dip galvannealed low-strength steel sheet, a high-strength steel sheet having a surface containing an iron-zinc solid solution phase and a zinc oxide layer, and an uncoated low-strength steel sheet are overlapped, and a laser beam is emitted from the side of the uncoated low-strength steel sheet, thereby forming the melted and solidified portion.

FIG. 11C shows an example in which three steels, an outer panel made out of a hot-dip galvannealed low-strength steel sheet 91LZ, a central reinforce made out of a high-strength steel sheet 92HR having a surface containing an iron-zinc solid solution phase and a zinc oxide layer, and an inner panel made out of an uncoated low-strength steel sheet 93L, are overlapped, and this serves as, for example, an example of structures of flange portions of an A-pillar and a roof rail of an automobile.

In this case, after spot welding, a laser beam LB is emitted from the side of the uncoated inner panel (low-strength steel sheet 93L) to be disposed on the inside of the cabin of the automobile body, thereby forming the melted and solidified portion 15 in the low-strength steel sheet 93L and the high-strength steel sheet 92HR having a surface containing an iron-zinc solid solution phase and a zinc oxide layer.

The melted and solidified portion 15 is formed by controlling such that the melted and solidified portion 15 does not reach the contact portion 16 on the side of the surface where the low-strength steel sheet 91LZ and the high-strength steel sheet 92HR having a surface containing an iron-zinc solid solution phase and a zinc oxide layer are overlapped, and the contact portion 16, where the hot-dip galvanneal coating lies, is not molten.

It should be noted that it is preferable that the depth LD92 of the melted and solidified portion 15 in the high-strength steel sheet 92HR having a surface containing an iron-zinc solid solution phase and a zinc oxide layer is set at a position externally spaced apart from the end of the nugget 12 of the spot-welded portion 10 by 1 mm, to be more than or equal to 50% of the thickness.

Figure 11D:
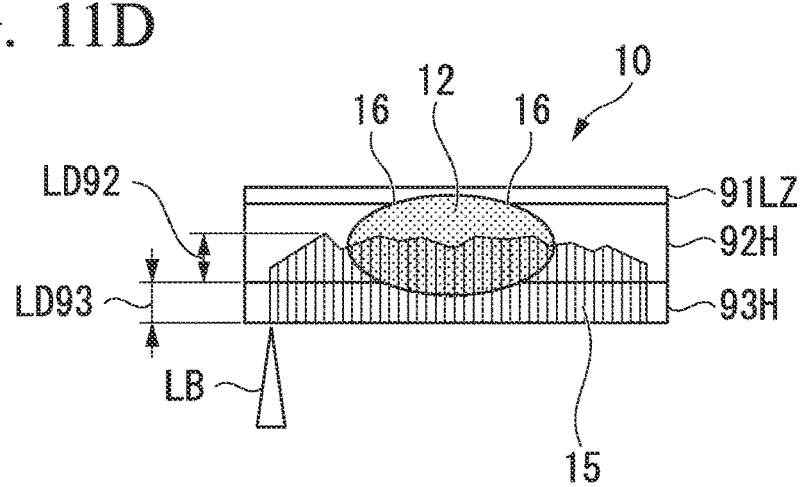
FIG. 11D is a diagram showing an example in which a hot-dip galvannealed low-strength steel sheet, an uncoated high-strength steel sheet, and an uncoated high-strength steel sheet are overlapped, and laser bean is emitted from the side of the uncoated high-strength steel sheet, thereby forming the melted and solidified portion.

FIG. 11D shows an example in which three steels, an outer panel made out of a hot-dip galvannealed low-strength steel sheet 91LZ, a central reinforce made out of an uncoated high-strength steel sheet 92H, and an inner panel made out of an uncoated high-strength steel sheet 93H, are overlapped, and this serves as, for example, an example of structures of flange portions of a roof rail and an A-pillar of an automobile.

In this case, after spot welding, a laser beam LB is emitted from the side of the uncoated inner panel (high-strength steel sheet 93H) to be disposed on the inside of the cabin of the automobile body, thereby forming the melted and solidified portion 15 in the high-strength steel sheet 93H and the high-strength steel sheet 92H.

The melted and solidified portion 15 is formed by controlling such that the melted and solidified portion 15 does not reach the contact portion 16 on the side of the surface where the low-strength steel sheet 91LZ and the high-strength steel sheet 92H are overlapped, and the contact portion 16, where the hot-dip galvanneal coating lies, is not molten.

It should be noted that it is preferable to set the depth LD92 of the melted and solidified portion 15 in the high-strength steel sheet 92H at a position externally spaced apart from the end of the nugget 12 of the spot-welded portion 10 by 1 mm, to be more than or equal to 50% of the thickness.

Figure 11E:
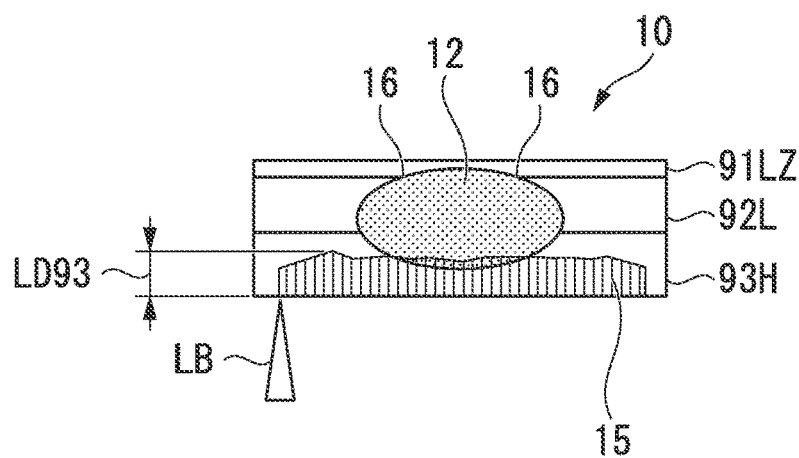
FIG. 11E is a diagram showing an example in which a hot-dip galvannealed low-strength steel sheet, an uncoated low-strength steel sheet, and an uncoated high-strength steel sheet are overlapped, and a laser beam is emitted from the side of the uncoated high-strength steel sheet, thereby forming the melted and solidified portion.
Figure 11F:
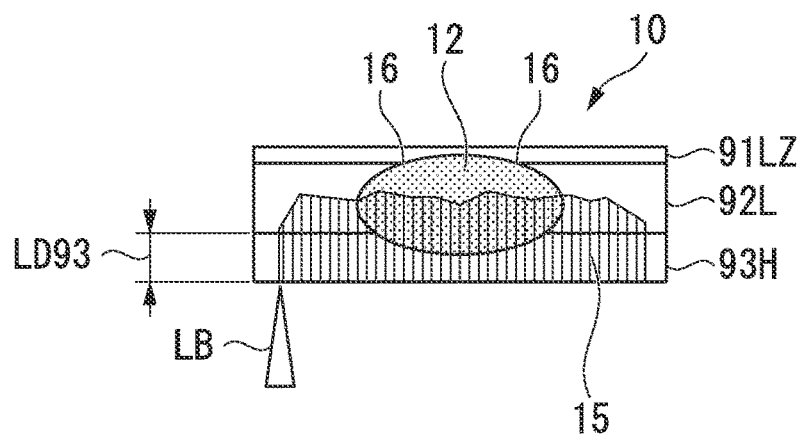
FIG. 11F is a diagram showing an example in which a hot-dip galvannealed low-strength steel sheet, an uncoated low-strength steel sheet, and an uncoated high-strength steel sheet are overlapped, and a laser beam is emitted from the side of the uncoated high-strength steel sheet, thereby forming the melted and solidified portion.

FIG. 11E and FIG. 11F are examples in which three steels, an outer panel including a hot-dip galvannealed low-strength steel sheet 91LZ, a central reinforce including an uncoated low-strength steel sheet 92L, and an inner panel including an uncoated high-strength steel sheet 93H, are overlapped, and these serve as, for example, examples of structures of an A-pillar upper and a roof rail of an automobile.

In this case, after spot welding, a laser beam LB is emitted from the side of the uncoated inner panel (high-strength steel sheet 93H) to be disposed on the inside of the cabin of the automobile body, and control is performed so as not to reach the contact portion 16 on the side of the surface where the low-strength steel sheet 91LZ and the low-strength steel sheet 92L are overlapped.

It may be possible that the formation is performed so as not to reach the contact portion 16 on the side of the surface where the low-strength steel sheet 91LZ and the low-strength steel sheet 92L are overlapped as shown in FIG. 11F, and so as to extend in the high-strength steel sheet 93H and the low-strength steel sheet 92L.

It should be noted that, in FIG. 11E and FIG. 11F, it is preferable to set the depth LD93 of the melted and solidified portion 15 in the high-strength steel sheet 93H at a position externally spaced apart from the end of the nugget 12 of the spot-welded portion 10 by 1 mm, to be more than or equal to 50% of the thickness.

The welded joint according to the present invention described above is suitable to be used in structural elements of automobiles made out of a high-strength steel sheet having a tensile strength of 1200 MPa or higher.

The welded joint can be applied, for example, to a bumper, a door beam, a floor member, a front-side member, and a rear-side member.

It should be noted that the present invention is not limited to the embodiments described above, and various modifications may be possible without departing from the scope of the present invention.

In the embodiments described above, the present invention is applied, as an example, to an automotive part. However, the present invention can be applied to various over-welded members formed by joining overlapped portions through spot welding, for example, in fittings, beams, and link members of a building, or in a simple warehouse, furniture, and office furniture.

Further, in the embodiments described above, for example, the targets are set to the high-strength steel sheet or the hot stamped member having a tensile strength of 1200 MPa or higher. However, the present invention can be applied to a high-strength steel sheet having a tensile strength of less than 1200 MPa and having a hardness in the HAZ softening zone less than the base material due to containing a quenched structure (martensite) such as a high-strength steel sheet of 980 MPa class.

Descriptions have been made of a case where two or three high-strength steel sheets are used as a steel sheet member made out of a plurality of steel sheets. However, four or more steel sheet members may be used.

Further, the plurality of steel sheets including a high-strength steel sheet means that it is only necessary that, of the plurality of steel sheets, at least one steel sheet is the high-strength steel sheet.

Further, in the present invention, it may be possible to form the overlapped portion by the plurality of steel sheets overlapping each other in a manner such that a member used for partial reinforcement is joined without using a flange as shown in FIG. 7B, or a flange is joined to a portion shaped through press forming.

EXAMPLES

The present invention will be described in more detail with reference to Examples.

Table 1 shows chemical components of samples. The unit in Table 1 is mass %, and the balance other than the chemical components indicated in Table 1 includes Fe and inevitable impurities.

TABLE 1

| Sample | Composition (mass %) | | | | | |
|---|---|---|---|---|---|---|
| | C | Si | Mn | P | S | Other |
| SQ1500 | 0.21 | 0.22 | 1.25 | 0.010 | 0.001 | 0.20Cr, 0.020Ti, 0.0015B |
| SQZ1500 | 0.21 | 0.04 | 1.30 | 0.010 | 0.001 | 0.20Cr, 0.021Ti, 0.0016B |
| SQ1800 | 0.30 | 0.20 | 1.69 | 0.010 | 0.001 | 0.23Cr, 0.021Ti, 0.08Nb, 0.0020B |
| JSC1270 | 0.14 | 0.49 | 1.85 | 0.007 | 0.004 | 0.05Ti |
| JSC440 | 0.11 | 0.07 | 1.10 | 0.021 | 0.003 | |
| JAC440 | 0.11 | 0.06 | 1.09 | 0.019 | 0.003 | |
| JSC590 | 0.08 | 0.03 | 2.30 | 0.015 | 0.003 | |

In Table 1, the sample SQ1500 is an uncoated steel sheet for hot stamping having a tensile strength of 1500 MPa class.

The sample SQZ1500 is a steel sheet for hot stamping having an iron-zinc solid solution layer and a zinc oxide layer coating thereon and having a tensile strength of 1500 MPa class.

The sample SQ1800 is an uncoated steel sheet for hot stamping having a tensile strength of 1800 MPa class.

The sample JSC1270 is an uncoated cold-rolled steel sheet having a tensile strength of 1270 MPa class.

Further, the sample JSC440 is an uncoated steel sheet of 440 MPa class.

The sample JAC440 is a steel sheet of 440 MPa class having hot-dip galvannealing applied thereon.

The sample JSC590 is an uncoated steel sheet of 590 MPa class.

It should be noted that the steel sheets for hot stamping are used by applying similar processing to hot stamping.

Example 1

Below, Example 1 will be described with reference to FIG. 12A to FIG. 12C and Table 2.

In Example 1, strain at the time of tensile testing was evaluated in the case where two uncoated steel sheets were overlapped.

Figure 12A:
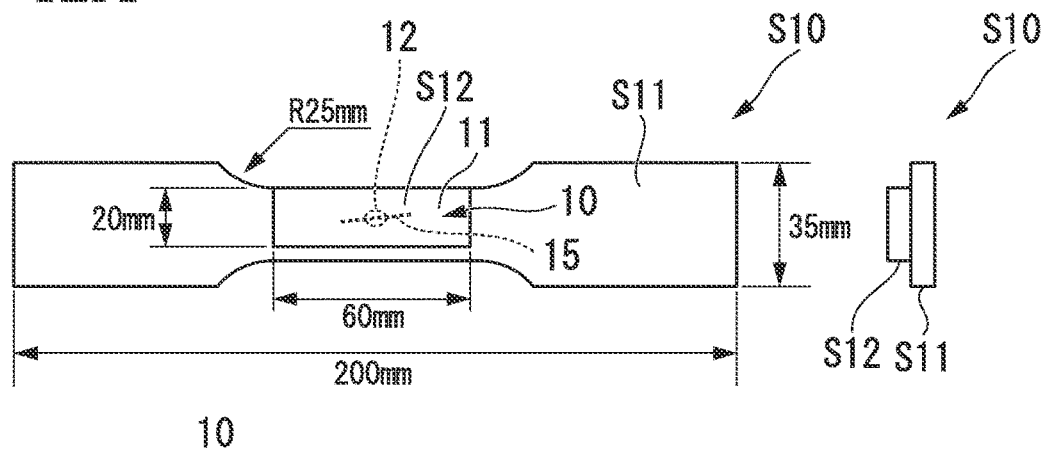
FIG. 12A is a diagram showing a test piece used in Example 1 according to the present invention.

FIG. 12A is a diagram schematically showing a test piece S10 used in this Example. FIG. 12B is an enlarged view showing a direction of tensile load applied to the test piece S10, and showing a testing method in this Example. FIG. 12C is a sectional view taken along line II-II of FIG. 12B.

Figure 12B:
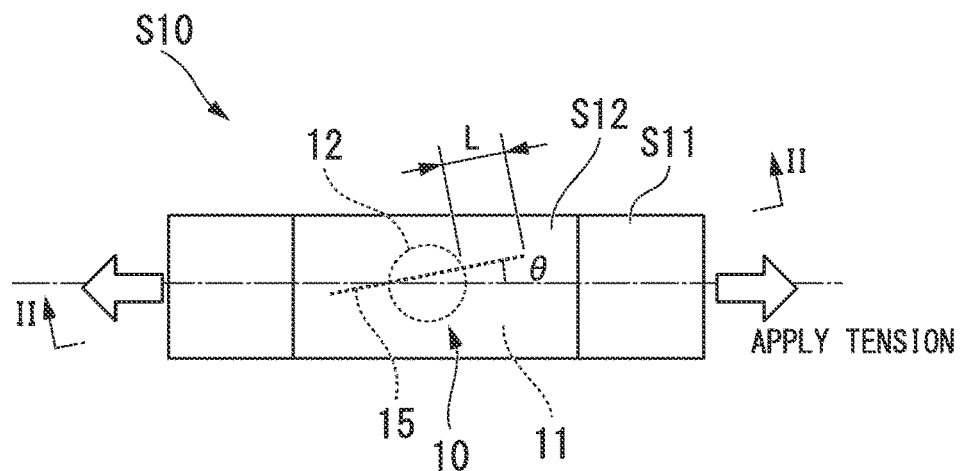
FIG. 12B is an enlarged view showing the test piece used in Example 1 according to the present invention, and is a plan view showing a direction in which tensile load is applied.

In Example 1, test pieces S10 as shown in FIG. 12A were obtained from the samples shown in Table 1, and tensile testing was executed by applying tensile load as shown in FIG. 12B to each of the test pieces.

In the tensile testing, the strain was measured until each of the test pieces S10 fractured, and the strain was evaluated according to four grades.

In the case of the test piece S10, two steel sheets, which were a steel sheet S11 made out of a sample 1 and a steel sheet S12 made out of a sample 2, were overlapped as shown in FIG. 12A, and resistance spot welding was applied to the overlapped portion 11, thereby forming a spot-welded portion 10.

Then, a laser beam was emitted from the side of the steel sheet S11 thereby forming a melted and solidified portion 15.

In the tensile testing, the steel sheet S11 made out of the sample 1 of the test piece S10 was pulled, whereby a tensile strength of the sample 1 was measured.

It should be noted that test pieces 1 and 12 shown in Table 2 are Comparative Examples, onto which no laser beam was emitted.

Spot welding was applied using a single-phase AC spot welding machine and using a DR-type electrode (top end φ6 mm R40) under the following conditions.

Squeezing force: 400 kgf
Welding time: 20 cyc
Welding current: splash occurring current −0.5 kA
The diameter (mm) of a nugget was set in the rage of 5√t to 6√t (t: thickness (mm))

Then, a laser beam was emitted onto the test piece S10 having the spot-welded portion 10 formed therein under conditions shown in Table 2, thereby forming a melted and solidified portion 15 having a straight shape.

Laser beam was emitted using Nd: YAG laser under the following conditions.

Beam diameter: 0.6 (mm),
Speed: 2.0 to 4.0 (m/min),
Shielding gas: argon 10 (1/min)

In order to vary the depth of the melted and solidified portion 15, the output was varied in a range of 1.5 kW to 4 kW.

The intersection angle θ(°) with the expected direction of stress for the melted and solidified portion 15 formed through emission of a laser beam or a direction along a flange (overlapped portion), the depth (%) of the melted and solidified portion 15, and the distance L (mm) from the end of the nugget 12 to the end of the melted and solidified portion 15 in FIG. 12B are set as shown in Table 2.

It should be noted that the depth (%) of the melted and solidified portion was calculated on the basis of the steel sheet S11 in a manner such that a depth (mm) of the melted and solidified portion was measured at a position spaced apart from the end of the nugget in the spot-welded portion by 1 mm, and the measured value was divided by the thickness of the steel sheet S11.

Next, tensile testing was performed for each of the test pieces.

In the tensile testing, strain until each of the test pieces fractured was measured by setting the gauge length to 50 mm, and fixing the tensile rate to 3 (mm/min).

(D) represents the strain until fracture being less than 3%, (C) represents the strain until fracture being not less than 3% and less than 3.5%, (B) represents the strain until fracture being not less than 3.5% and less than 4%, and (A) represents the strain until fracture being not less than 4%.

Table 2 shows the test results.

Example 2

Below, Example 2 will be described with reference to FIG. 13A to FIG. 13C, and Table 3.

In Example 2, the strain was evaluated through tensile testing in the case where three uncoated steel sheets were overlapped.

Figure 13A:
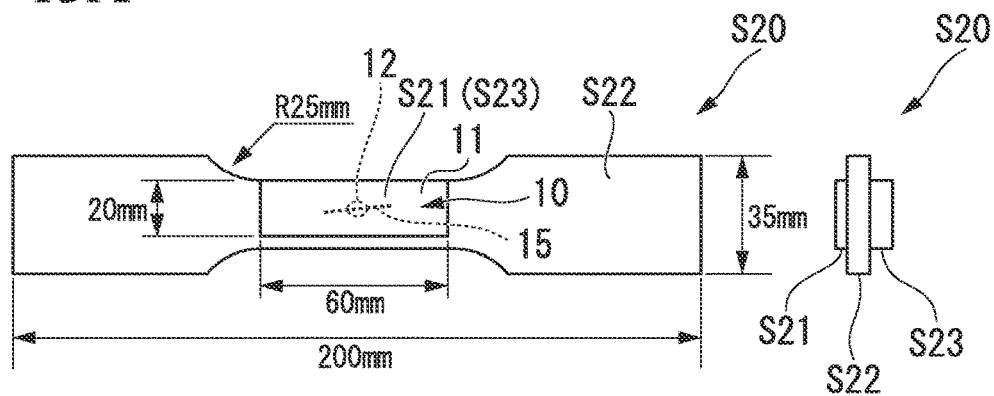
FIG. 13A is a diagram showing a test piece used in Example 2 according to the present invention.

FIG. 13A is a diagram schematically showing a test piece S20 used in Example 2. FIG. 13B is an enlarged view showing a direction of tensile load applied to the test piece S20 and showing a testing method in this Example. FIG. 13C is a sectional view taken along line III-III of FIG. 13B.

Figure 13B:
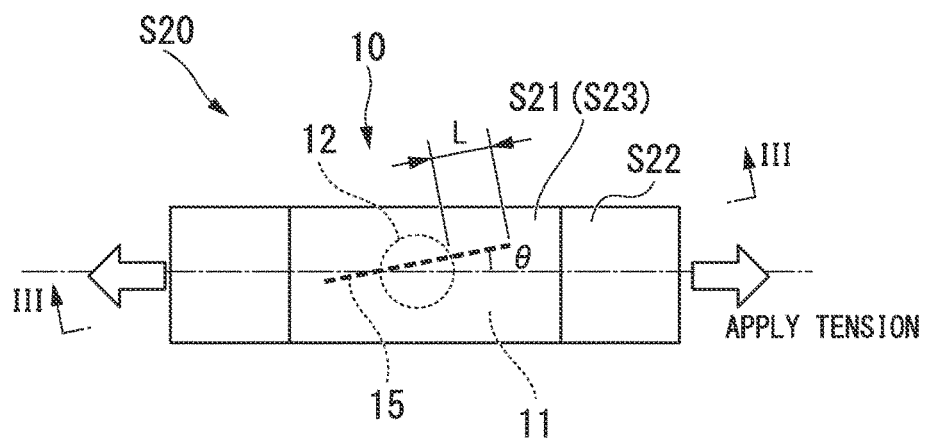
FIG. 13B is an enlarged view showing the test piece used in Example 2 according to the present invention, and is a plan view showing a direction in which tensile load is applied.
Figure 13C:
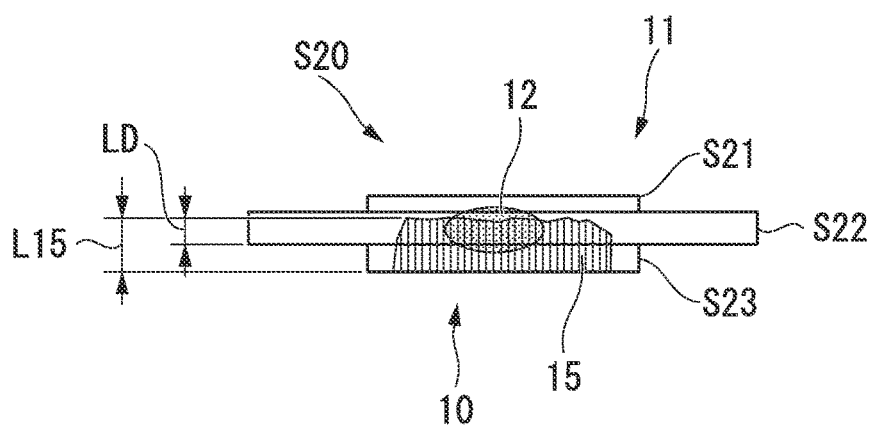
FIG. 13C is an explanatory view showing the shape of the test piece used in Example 2 according to the present invention, and is a sectional view taken along line III-III of FIG. 13B.

In Example 2, test pieces S20 as shown in FIG. 13A were obtained from the samples shown in Table 3, and tensile testing was executed by applying tensile load as shown in FIG. 13B to each of the test pieces.

In the tensile testing, strain until each of the test pieces S20 fractures was measured, and the strain was evaluated according to four grades.

In the case of the test piece S20, three steel sheets, which were a steel sheet S21 made out of a sample 1, a steel sheet

TABLE 2

| Number | Sample 1 | Sample 2 | Intersection angle θ (°) of melted and solidified portion | Depth (%) of melted and solidified portion | Length (mm) of melted and solidified portion | Results of tensile testing | Note |
|---|---|---|---|---|---|---|---|
| 1 | SQ1500-1.6t | JSC440-1.6t | Only spot welding | | | C | Comparative Example |
| 2 | SQ1500-1.6t | JSC440-1.6t | 0 | 100 | 10 | A | Example according to the present invention |
| 3 | SQ1500-1.6t | JSC440-1.6t | 15 | 100 | 10 | A | Example according to the present invention |
| 4 | SQ1500-1.6t | JSC440-1.6t | 30 | 100 | 10 | A | Example according to the present invention |
| 5 | SQ1500-1.6t | JSC440-1.6t | 45 | 100 | 10 | C | Comparative Example |
| 6 | SQ1500-1.6t | JSC440-1.6t | 0 | 20 | 10 | B | Comparative Example |
| 7 | SQ1500-1.6t | JSC440-1.6t | 0 | 50 | 10 | A | Example according to the present invention |
| 8 | SQ1500-1.6t | JSC440-1.6t | 0 | 80 | 10 | A | Example according to the present invention |
| 9 | SQ1500-1.6t | JSC440-1.6t | 0 | 100 | 2 | C | Comparative Example |
| 10 | SQ1500-1.6t | JSC440-1.6t | 0 | 100 | 3 | A | Example according to the present invention |
| 11 | SQ1500-1.6t | JSC440-1.6t | 0 | 100 | 20 | A | Example according to the present invention |
| 12 | JSC1270-1.6t | JSC440-1.6t | Only spot welding | | | B | Comparative Example |
| 13 | JSC1270-1.6t | JSC440-1.6t | 0 | 100 | 10 | A | Example according to the present invention |
| 14 | SQZ1500-1.6t | JSC440-1.6t | 0 | 100 | 10 | A | Example according to the present invention |
| 15 | SQ1800-1.6t | JSC440-1.6t | 0 | 100 | 10 | A | Example according to the present invention |
| 16 | SQ1500-1.6t | SQ1500-l.6t | 0 | 100 | 10 | A | Example according to the present invention |
| 17 | SQ1500-1.6t | SQ1500-1.2t | 0 | 100 | 10 | A | Example according to the present invention |
| 18 | SQ1500-1.6t | JAC440-1.6t | 0 | 80 | 10 | A | Example according to the present invention |

As shown in Table 2, Comparative Examples indicated as numbers 6 and 12 exhibited fracture strain in a range of not less than 3.5% and less than 4%, and hence, the test result thereof falls in (B).

Further, Comparative Examples indicated as numbers 1, 5, and 9 fractured in a HAZ softening zone of the spot-welded portion with small strain, and exhibited fracture strain less than 3.5%, and hence, the test result thereof falls in (C).

On the other hand, all of the test pieces of Examples according to the present invention exhibited fracture strain more than or equal to 4%.

S22 made out of a sample 2, and a steel sheet S23 made out of a sample 3, were overlapped as shown in FIG. 13A, and resistance spot welding was applied to the overlapped portion 11, thereby forming a spot-welded portion 10.

Then, a laser beam is emitted from the side of the steel sheet S23, thereby forming a melted and solidified portion 15.

In the tensile testing, the steel sheet S22 made out of the sample 2 of the test piece S20 was pulled, whereby a tensile strength of the sample 2 was measured.

It should be noted that a test piece with number 1 shown in Table 3 is the Comparative Example, onto which no laser beam was emitted.

Further, a test piece with number 4 is the Comparative Example, onto which a laser beam was emitted to reach a contact portion where zinc coating was formed.

The test piece S20 was created by applying resistance spot welding and emitting a laser beam onto the spot-welded portion 10 in a similar manner to that in Example 1, and hence, explanation thereof will not be repeated.

The intersection angle θ(°) with the expected direction of stress for the melted and solidified portion 15 formed through emission of a laser beam or a direction along a flange (overlapped portion), the depth (%) of the melted and solidified portion 15, and the distance L (mm) from the end of the nugget 12 to the end of the melted and solidified portion 15 in FIG. 13B are set as shown in Table 3.

It should be noted that the depth (%) of the melted and solidified portion was calculated on the basis of the steel sheet S22 made out of a high-strength steel sheet in a manner such that a depth (mm) of the melted and solidified portion was measured at a position spaced apart from the end of the nugget in the spot-welded portion by 1 mm, and the measured value was divided by the thickness of the steel sheet S22.

In Example 2, each of the test pieces was subjected to tensile testing and evaluation in a similar manner to that in Example 2, and hence, explanation thereof will not be repeated here.

strength of 1500 MPa class, and a steel sheet S12 is made out of a steel sheet SQZ1500 for hot stamping having a tensile strength of 1500 MPa class and having an iron-zinc solid solution layer and a zinc oxide layer coating thereon, or a hot-dip galvannealed steel sheet of 440 MPa class.

Table 4 shows a sample 1 for the steel sheet S11, a sample 2 for the steel sheet S12, and test results.

(Judgment A) means that no hole defect exists, and (Judgment C) means that at least one hole defect exists.

TABLE 4

| Number | Sample 1 | Sample 2 | Depth (%) of melted and solidified portion | Hole defect | Note |
|---|---|---|---|---|---|
| 1 | SQ1500-1.6t | JAC440-1.6t | 100 | C | Comparative Example |
| 2 | SQ1500-1.6t | SQZ1500-1.6t | 100 | A | Example according to the present invention |
| 3 | SQ1500-1.6t | JAC440-1.6t | 50 | A | Example according to the present invention |
| 4 | SQ1500-1.6t | JAC440-1.6t | 80 | A | Example according to the present invention |

TABLE 3

| Number | Sample 1 | Sample 2 | Sample 3 | Intersection angle θ (°) of melted and solidified portion | Depth (%) of melted and solidified portion | Length (mm) of melted and solidified portion | Results of tensile testing | Note |
|---|---|---|---|---|---|---|---|---|
| 1 | JAC270D-0.7t | SQZ1500-1.6t | JSC440-1.2t | Only spot welding | | | C | Comparative Example |
| 2 | JAC270D-0.7t | SQZ1500-1.6t | JSC440-1.2t | 0 | 70 | 12 | A | Example according to the present |
| 3 | JAC270D-0.7t | SQZ1500-1.6t | JSC590-1.2t | 0 | 70 | 12 | A | Example according to the present |
| 4 | JAC270D-0.7t | SQZ1500-1.2t | JSC440-1.4t | 0 | 100 | 12 | C | Comparative Example |
| 5 | JAC270D-0.7t | SQ1800-1.6t | JSC590-1.2t | 0 | 70 | 12 | A | Example according to the present |
| 6 | JAC270D-0.7t | SQ1800-1.8t | JSC590-1.2t | 0 | 80 | 12 | A | Example according to the present |

As shown in Table 3, Comparative Example indicated as number 1 fractured in a HAZ softening zone of the spot-welded portion with small strain, and exhibited fracture strain less than 3.5%, and hence, the test result thereof falls in (C).

Further, Comparative Example indicated as number 4 had a hole defect, and the test result thereof falls in (C).

On the other hand, all of the test pieces of Examples according to the present invention exhibited fracture strain more than or equal to 4%.

Example 3

Below, Example 3 will be described with reference to Table 4.

Figure 12C:
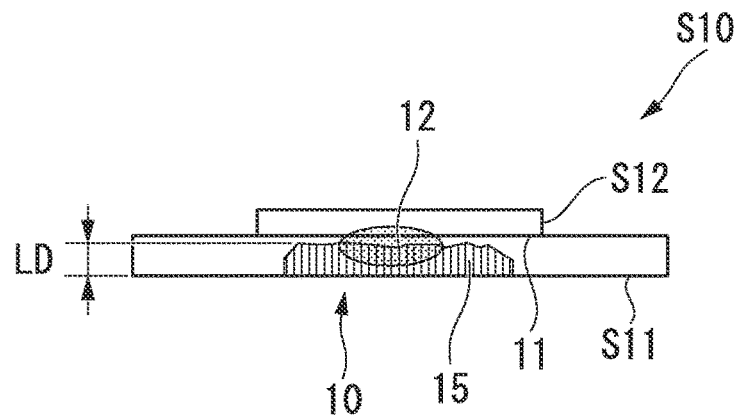
FIG. 12C is an explanatory view showing the shape of the test piece used in Example 1 according to the present invention, and is a sectional view taken along line II-II of FIG. 12B.

In Example 3, using the test piece S10 shown in FIG. 12A to FIG. 12C, evaluation was made as to whether any hole defect was generated in the contact portion 16 between the steel sheet S11 and the steel sheet S12 during processes in which coated steel sheets were overlapped, the spot-welded portion 10 was formed through resistance spot welding, and then, a laser beam was emitted to form the melted and solidified portion 15.

In Example 3, a steel sheet S11 is made out of an uncoated steel sheet SQ1500 for hot stamping having a tensile As shown in Table 4, Comparative Example indicated as number 1 had the hole defect, since the melted and solidified portion formed through a laser beam emitted from the side of the steel sheet S11 is formed throughout the entire thickness of the steel sheet S11 and reaches the steel sheet S12.

Thus, the test result indicates that the hole defect exists (Judgment C).

In the case of Examples according to the present invention indicated as number 2 and number 3, no hole defect was found (Judgment A), since the depths of the melted and solidified portions were 80% and 50% of the thickness, and each of the melted and solidified portions does not reach the contact portion between the steel sheet S11 and the steel sheet S12.

Further, in the case of the steel sheet SQZ1500 for hot stamping indicated as number 4, which has a tensile strength of 1500 MPa class and has an iron-zinc solid solution layer and a zinc oxide layer coating thereon, the melted and solidified portion was formed throughout the entire thickness of the steel sheet S11. However, in the contact portion, zinc did not explosively vaporize, and the molten steel was not blown away. Thus, no hole defect was found.

INDUSTRIAL APPLICABILITY

According to the method of welding an overlapped portion, the method of manufacturing an overlap-welded member, the overlap-welded member and the automotive part of the present invention, it is possible to prevent the spot-welded portion in the overlapped portion from fracturing in HAZ softening zone. Thus, the method of welding an overlapped portion, the method of manufacturing an overlap-welded member, the overlap-welded member and the automotive part of the present invention are industrially applicable.

BRIEF DESCRIPTION OF THE REFERENCE SYMBOLS

LB laser beam
1, 4, 4A Flange (overlapped portion)
2, 3 Formed article (steel sheet member)
5H, 6H, 31H, 32H, 61H, 62H, 92H, 93H High-strength steel sheet (steel sheet member)
7L, 31L, 33L, 61L, 62L, 63L, 92L, 93L Low-strength steel sheet (steel sheet member)
16 Contact portion
7 Member (steel sheet member)
8 Overlapped member (steel sheet member)
10 Spot-welded portion
12 Nugget
13 HAZ softening zone
15 Melted and solidified portion
40 A-pillar (steel sheet member)
41 B-pillar (steel sheet member)
42 Roof rail (steel sheet member)
43 Side sill (steel sheet member)
44 Bumper reinforce (steel sheet member)
45 Bulkhead (steel sheet member)
91LZ Hot-dip galvannealed low-strength steel sheet (steel sheet member)
92HR High-strength steel sheet (high-strength steel sheet having a surface containing an iron-zinc solid solution phase and a zinc oxide layer) (steel sheet member)
92HP High-strength steel sheet (hot stamped member having an iron-zinc solid solution layer and a zinc oxide layer coating thereon, or hot stamped member having an intermetallic compound of iron and aluminum coating thereon) (steel sheet member)

The invention claimed is:

1. A method of welding an overlapped portion in which a plurality of steel sheet members are joined at the overlapped portion, the method including:
arranged an overlapped portion of the plurality of steel sheet members, wherein at least one of the plurality of steel sheet members contains martensite, and the plurality of steel sheet members comprise steel sheets in which a heat affected zone (HAZ) softened portion of which a hardness is less than a base material is scheduled to be formed by a spot welding, the method including;
forming a spot-welded portion having a nugget in the overlapped portion; and
reducing the area of a HAZ softening zone of the spot-welded portion by forming a melted and solidified portion crossing an end of the nugget, the melted and solidified portion being formed in the steel sheet member containing the martensite so as to have a depth of not less than 50% of a thickness of the steel sheet member containing the martensite at a position externally spaced apart from the end of the nugget by 1 mm, wherein forming the melted and solidified portion comprises: emitting a laser beam from a position which is located between the nugget and a position externally spaced apart from the end of the nugget by not less than 3 mm; emitting the laser beam to run in a direction along a longitudinal direction of the steel sheet member containing the martensite to intersect with the spot-welded portion such that direction of run of the laser beam crosses the end of the nugget so as to have an intersection angle θ within ±30° with respect to an expected direction of stress.

2. A method of manufacturing an overlap-welded member, including:
overlapping a plurality of steel sheet members at an overlapped portion; and
performing a welding in accordance with the method of welding the overlapped portion according to claim 1.

3. An automotive part which includes the overlap-welded member according to claim 2.

* * * * *